United States Patent
Fujie

(10) Patent No.: US 9,528,014 B2
(45) Date of Patent: *Dec. 27, 2016

(54) COLORING COMPOSITION, INK FOR INKJET RECORDING USING THE COLORING COMPOSITION, METHOD FOR INKJET RECORDING USING THE INK FOR INKJET RECORDING, INK CARTRIDGE, AND INKJET RECORDING MATERIAL

(71) Applicant: FUJIFILM Corporation, Tokyo (JP)

(72) Inventor: Yoshihiko Fujie, Fujinomiya (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/712,289

(22) Filed: May 14, 2015

(65) Prior Publication Data

US 2015/0247048 A1    Sep. 3, 2015

Related U.S. Application Data

(63) Continuation of application No. PCT/JP2013/080467, filed on Nov. 11, 2013.

(30) Foreign Application Priority Data

Nov. 15, 2012  (JP) .................. 2012-251685

(51) Int. Cl.
| | |
|---|---|
| C09D 11/00 | (2014.01) |
| C09D 11/328 | (2014.01) |
| C09B 47/067 | (2006.01) |
| C09B 47/073 | (2006.01) |
| C08K 5/3417 | (2006.01) |
| C08K 5/47 | (2006.01) |
| C09D 5/14 | (2006.01) |
| C09B 67/22 | (2006.01) |

(52) U.S. Cl.
CPC ........... C09D 11/328 (2013.01); C08K 5/3417 (2013.01); C08K 5/47 (2013.01); C09B 47/0678 (2013.01); C09B 47/073 (2013.01); C09B 67/0035 (2013.01); C09D 5/14 (2013.01)

(58) Field of Classification Search
CPC .............................. C09D 11/00; C09D 11/328
USPC .............................................. 106/31.49; 8/661
See application file for complete search history.

(56) References Cited

U.S. PATENT DOCUMENTS

| | | |
|---|---|---|
| 2004/0045478 A1 | 3/2004 | Tateishi et al. |
| 2005/0117006 A1 | 6/2005 | Taguchi |
| 2007/0186810 A1 | 8/2007 | Taga et al. |
| 2010/0075040 A1 | 3/2010 | Tateishi et al. |
| 2014/0238264 A1 | 8/2014 | Fujie et al. |

FOREIGN PATENT DOCUMENTS

| | | |
|---|---|---|
| CN | 103917607 A | 7/2014 |
| EP | 1 364 994 A1 | 11/2003 |
| EP | 2 778 201 A1 | 9/2014 |

(Continued)

OTHER PUBLICATIONS

English translation of PCT/ISA/409 issued May 21, 2015, by the International Search Authority in related International Application No. PCT/JP2013/080467.

(Continued)

*Primary Examiner* — Lam Nguyen
(74) *Attorney, Agent, or Firm* — Sughrue Mion, PLLC

(57) ABSTRACT

In accordance with an embodiment of the present invention, there is provided a coloring composition comprising, for example, a compound (1A), for example, a compound (2B), and at least one preservative.

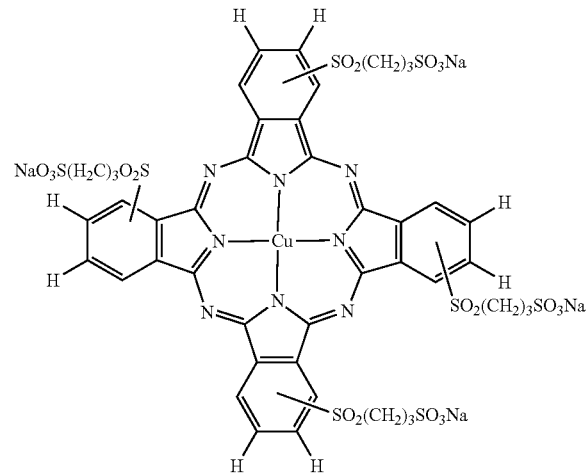

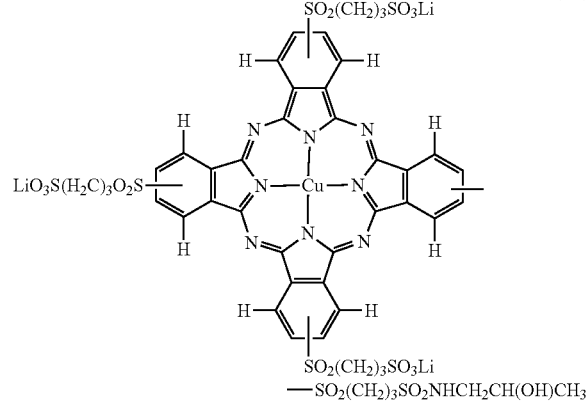

22 Claims, No Drawings

(56) References Cited

FOREIGN PATENT DOCUMENTS

| JP | 2002249677 A | 9/2002 |
|----|----|----|
| JP | 2007-065355 A | 3/2007 |
| JP | 2007217533 A | 8/2007 |
| JP | 4538229 B2 | 9/2010 |
| WO | 03/066753 A1 | 8/2003 |
| WO | 2013/069667 A1 | 5/2013 |

OTHER PUBLICATIONS

ISR (PCT/ISA/210) issued Feb. 10, 2014, by the International Search Authority in related International Application No. PCT/JP2013/080467.

Written Opinion (PCT/ISA/237) issued Feb. 10, 2014, by the International Search Authority in related International Application No. PCT/JP2013/080467.

PCT/IPEA/409 issued Jan. 29, 2015, in related International Application No. PCT/JP2013/080467.

Office Action from the Japanese Patent Office dated Jan. 19, 2016 in counterpart Japanese Application No. 2014-546976.

Office Action dated Dec. 1, 2015, issued by the State Intellectual Property Office of the People's Republic of China in counterpart Chinese Application No. 201380059836.2.

Extended European Search Report dated Jul. 1, 2016, from the European Patent Office in counterpart European Application No. 13854707.0.

Office Action issued on Sep. 19, 2016, by the Korean Intellectual Property Office in counterpart Korean Application No. 2015-7012084.

COLORING COMPOSITION, INK FOR INKJET RECORDING USING THE COLORING COMPOSITION, METHOD FOR INKJET RECORDING USING THE INK FOR INKJET RECORDING, INK CARTRIDGE, AND INKJET RECORDING MATERIAL

CROSS REFERENCE TO RELATED APPLICATION

This is a continuation of International Application No. PCT/JP2013/080467 filed on Nov. 11, 2013, and claims priority from Japanese Patent Application No. 2012-251685 filed on Nov. 15, 2012, the entire disclosures of which are incorporated herein by reference.

BACKGROUND

1. Technical Field

The present invention relates to a coloring composition in which color and ozone gas fastness are, excellent, bronze gloss is suppressed, print quality such as print density is high, temporal stability and preserve performance are high at a high concentration, and particularly, discharge stability after long-term storage in an aqueous solution is excellent, an ink for inkjet recording using the coloring composition, a method for inkjet recording using the ink for inkjet recording, an ink cartridge, and an inkjet recording material.

2. Background Art

Recently, as computers are distributed, inkjet printers are widely used to print on paper, film, fabric, and the like in households as well as in offices.

The inkjet recording method includes a method of discharging a liquid drop by applying pressure by a piezo element, a method of discharging a liquid drop by generating bubbles in ink by heat, a method of using an ultrasonic wave, and a method of absorbing a liquid drop by electrostatic force and discharges it. An aqueous ink, an oily ink or a solid (melt type) ink is used as an ink for inkjet recording. Among these inks, an aqueous ink is mostly used in terms of manufacture, handlability, odor, stability, etc.

A colorant used as ink for inkjet recording needs to ensure favorable solubility to a solvent, recording at a high concentration, favorable colors, excellent fastness to light, heat, air, active gas ($NO_x$, $S_x$, other than oxidative gas such as ozone) in an environment, and water or chemicals, good settlement to an image-receiving material, low spreading, excellent preservation as ink, non-toxicity, high purity, and availableness at low price.

In addition, since an aqueous ink is easily decomposed and fungi is easy to grow, if the ink is left for a long time, the physical property of the ink caused by the decomposition may be changed or the grown fungi may become an alien substance of the ink, so that the ink discharge is significantly deteriorated. Furthermore, since the color of the colorant having the fungi easily affects color tone, the color of the ink after storage or the color storability of images over time after printing may deteriorate.

Regarding the ink for inkjet recording containing preservatives, for example, Japanese Patent Publication No. 4538229 discloses an ink for inkjet recording which is made by dissolving or dispersing an azo dye or a phthalocyanine dye having a particular structure, wherein the dye is an aqueous dye having a noble oxidation potential than 1.0 V (vsSCE) and the ink contains at least one preservative. Also, Japanese Patent Application Laid-Open No. 2007-217533 discloses an ink for inkjet recording containing a phthalocyanine dye having a particular structure, and a thiazole compound.

However, it is very difficult to seek a dye that satisfies these requirements at a high level.

Although various dyes or pigments have been suggested for inkjet and have been used in practice, a colorant that satisfies all requirements has not yet been found. A conventionally well-known dye or pigment having an assigned color index number (C.I.) is difficult to balance fastness and the color required in the ink for inkjet recording.

The present invention has been made in view of such circumstances, and an object thereof is to provide a coloring composition in which color and ozone gas fastness are excellent, bronze gloss is suppressed, print quality such as print density is high, temporal stability and preserve performance are high at a high concentration, and particularly, discharge stability after long-term storage in an aqueous solution is excellent, an ink for inkjet recording using the coloring composition, a method for inkjet recording using the ink for inkjet recording, an ink cartridge, and an inkjet recording material.

To solve the aforesaid problems, the present inventors have intensively studied and found that the object of the invention may be achieved by a coloring composition described below. The functioning mechanism thereof is unclear, but can be inferred as follows.

First, the coloring composition of the present invention contains a dye represented by Formula (2) and having strong associativity and high fastness to ozone gases and the like, and a dye represented by Formula (1) and having weak associativity and high print density. Accordingly, it is considered that associativity of dyes may be controlled and high fastness to ozone gases and high print density may be balanced.

It is also considered that the control of association allows for favorable color and suppressed bronze gloss.

Further, it is considered that in the coloring composition of the present invention, the preservative property of the coloring composition is improved by containing preservative performance and the emergence of fungi is prevented by the antifungal action of the preservatives, and as a result, clogging in a nozzle, etc. rarely occurs and high-quality printing materials may be obtained.

Furthermore, the use in combination with a compound represented by Formula (1), a compound represented by Formula (2), and preservatives is considered to inhibit the emergence or precipitation of fungi, which is noticeable in an aqueous solution of high concentration containing no organic solvent during long-term storage. As a result, it is considered that the temporal stability of the coloring composition is improved, good discharge stability is obtained despite the use of the ink made in an aqueous solution at high concentration after long-term storage, and high quality printing is possible.

SUMMARY

The objectives of the present invention have been achieved by the following method.

[1] A coloring composition comprising a phthalocyanine dye represented by the following Formula (1), and a phthalocyanine dye represented by the following Formula (2), and at least one preservative.

(1)

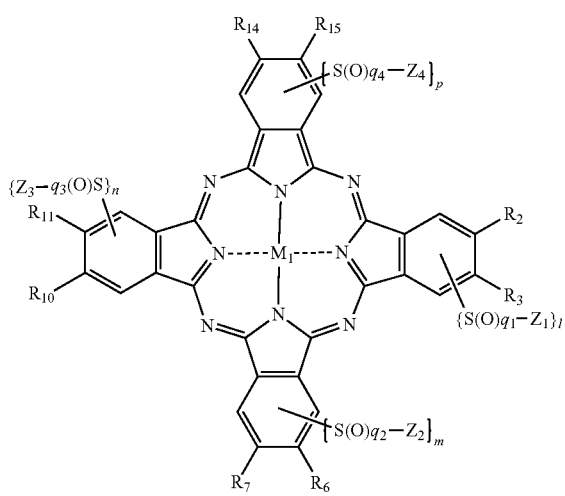

In Formula (1),
$R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further have a substituent.

$Z_1$, $Z_2$, $Z_3$ and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. However, at least one of $Z_1$, $Z_2$, $Z_3$ and $Z_4$ has an ionic hydrophilic group as a substituent.

l, m, n, p, $q_1$, $q_2$, $q_3$ and $q_4$ each independently represent 1 or 2.

$M_1$ represents a hydrogen atom, a metal element, a metal oxide, a metal hydroxide or a metal halide.

Formula (2)

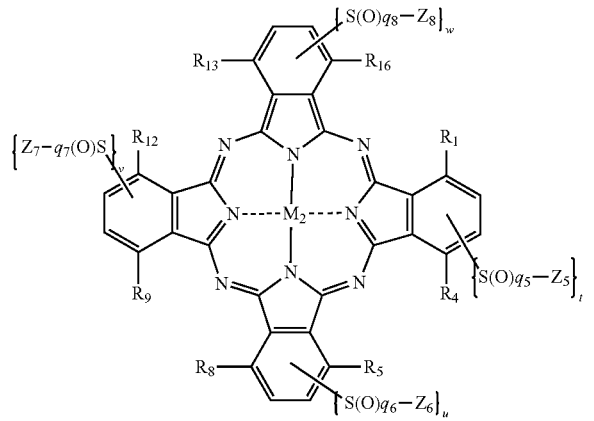

In Formula (2),
$R_1$, $R_4$, $R_5$, $R_8$, $R_9$, $R_{12}$, $R_{13}$ and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further have a substituent.

$Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. However, at least one of $Z_5$, $Z_6$, $Z_7$ and $Z_8$ has an ionic hydrophilic group as a substituent.

t, u, v, w, $q_5$, $q_6$, $q_7$ and $q_8$ each independently represent 1 or 2.

$M_2$ represents a hydrogen atom, a metal element, a metal oxide, a metal hydroxide or a metal halide.

[2] The coloring composition described in [1], wherein in the phthalocyanine dye represented by Formula (2), $R_1$, $R_4$, $R_5$, $R_8$, $R_9$, $R_{12}$, $R_{13}$ and $R_{16}$ are a hydrogen atom.

[3] The coloring composition described in [1] or [2], wherein in the phthalocyanine dye represented by Formula (2), $Z_5$, $Z_6$, $Z_7$, and $Z_8$ each represent a substituted or unsubstituted alkyl group, a substituted or unsubstituted aryl group, or a substituted or unsubstituted heterocyclic group.

[4] The coloring composition described in any one of [1] to [3], wherein in the phthalocyanine dye represented by Formula (2), $Z_5$, $Z_6$, $Z_7$, and $Z_8$ represent a substituted alkyl group, and at least one of the substituents possessed by the alkyl group is —$SO_2NHR$ group (however, R represents a substituted or unsubstituted alkyl group or a substituted or unsubstituted phenyl group).

[5] The coloring composition described in any one of [1] to [4], wherein in the phthalocyanine dye represented by Formula (2), t, u, v and w are 1.

[6] The coloring composition described in any one of [1] to [5], wherein in the phthalocyanine dye represented by Formula (2), $q_5$, $q_6$, $q_7$ and $q_8$ are 2.

[7] The coloring composition described in any one of [1] to [6], wherein in the phthalocyanine dye represented by Formula (2), $R_2$, $R_3$, $R_6$, $R_7$, $R_{10}$, $R_{11}$, $R_{14}$ and $R_{15}$ are a hydrogen atom.

[8] The coloring composition described in any one of [1] to [7], wherein in the phthalocyanine dye represented the Formula (1), $Z_1$, $Z_2$, $Z_3$, and $Z_4$ each represent a substituted or unsubstituted alkyl group, a substituted or unsubstituted aryl group, or a substituted or unsubstituted heterocyclic group.

[9] The coloring composition described in any one of [1] to [8], wherein in the phthalocyanine dye represented by Formula (1), l, m, n and p are 1.

[10] The coloring composition described in any one of [1] to [9], wherein in the phthalocyanine dye represented by Formula (1), ($q_1$, $q_2$, $q_3$ and $q_4$ are 2.

[11] The coloring composition described in any one of [1] to [10], wherein the content of the phthalocyanine dye represented by Formula (1) is 0.1% by mass to 10% by mass.

[12] The coloring composition described in any one of [1] to [11], wherein the mass ratio of the phthalocyanine dye represented by Formula (1) and the phthalocyanine dye represented by Formula (2), is 50/50 to 10/90.

[13] The coloring composition described in any one of [1] to [12], wherein the at least one preservative includes at least one preservative selected from the group consisting of a heterocyclic compound, a phenol derivative, a phenoxy ether derivative, and alkanediols.

[14] The coloring composition described in [13], wherein the at least one preservative includes the heterocyclic compound and the heterocyclic compound is a thiazole-based compound or a benzotriazole-based compound.

[15] The coloring composition described in any one of [1] to [14], containing two or more types of preservatives.

[16] The coloring composition described in [15], wherein the content of each preservative is 20% by mass or more based on the total content of preservatives.

[17] The coloring composition described in any one of [1] to [16], wherein the total content of preservatives is 0.01% by mass to 0.5% by mass.

[18] The coloring composition described in any one of [1] to [17], wherein the mass ratio of the total amount of the phthalocyanine dye represented by Formula (1) and the phthalocyanine dye represented by Formula (2) to preservatives, is 90/10 to 99/1.

[19] An ink for inkjet recording comprising the coloring composition described in any one of [1] to [18].

[20] A method for inkjet recording comprising forming a color image on a material to be recorded using the ink for inkjet recording described in [19].

[21] An ink for inkjet recording refilled with the ink for inkjet recording described in [19].

[22] An inkjet recording material which forms a color image on a material to be recorded using the ink for inkjet recording described in [19].

According to the present invention, a coloring composition in which color and ozone gas fastness are excellent, bronze gloss is suppressed, print quality such as print density is high, temporal stability and preserve performance are high at a high concentration, and particularly, discharge stability after long-term storage in an aqueous solution is excellent, an ink for inkjet recording using the coloring composition, a method for inkjet recording using the ink for inkjet recording, an ink cartridge, and an inkjet recording material, are provided.

DETAILED DESCRIPTION OF EXEMPLARY EMBODIMENTS

In the present invention, Group A of substituents is defined as follows.

(Group A of Substituents)

A halogen atom (e.g., a chlorine atom, a bromine atom); a straight or a branched alkyl group having 1 to 12 carbon atoms, an aralkyl group having 7 to 18 carbon atoms, an alkenyl group having 2 to 12 carbon atoms, a straight or a branched alkynyl group having 2 to 12 carbon atoms, a cycloalkyl group having 3 to 12 carbon atoms, which may have a side chain, a cycloalkenyl group having 3 to 12 carbon atoms, which may have a side chain (specific examples of such groups include methyl, ethyl, propyl, isopropyl, t-butyl, 2-methanesulfonylethyl, 3-phenoxypropyl, trifluoromethyl, cyclopentyl); an aryl group (e.g., phenyl, 4-t-butylphenyl, 2,4-di-t-amylphenyl); a heterocyclic group (e.g., imidazolyl, pyrazolyl, triazolyl, 2-furyl, 2-thienyl, 2-pyrimidinyl, 2-benzothiazolyl); an alkyloxy group (e.g., methoxy, ethoxy, 2-methoxyethoxy, 2-methanesulfonyl-ethoxy); an aryloxy group (e.g., phenoxy, 2-methylphenoxy, 4-t-butylphenoxy, 3-nitrophenoxy, 3-t-butyloxycarbamoylphenoxy, 3-methoxycarbamoyl); an acylamino group (e.g., acetamide, benzamide, 4-(3-t-butyl-4-hydroxyphenoxy)butanamide); an alkyl amino group (e.g., methylamino, butylamino, diethylamino, methylbutylamino); an anilino group (e.g., phenylamino, 2-chloroanilino); an ureido group (e.g., phenylureido, methylureido, N,N-dibutyl ureido); a sulfamoylamino group (e.g., N,N-dipropylsulfamoylamino); an alkylthio group (e.g., methylthio, octylthio, 2-phenoxyethylthio); an arylthio group (e.g., phenylthio, 2-butoxy-5-t-octylphenylthio, 2-carboxyphenylthio); an alkyloxycarbonylamino group (e.g., methoxycarbonylamino); a sulfonamide group (e.g., methanesulfonamide, benzenesulfonamide, p-toluenesulfonamide, octadecane); a carbamoyl group (e.g., N-ethylcarbamoyl, N,N-dibutylcarbamoyl); a sulfamoyl group (e.g., N-ethylsulfamoyl, N,N-dipropylsulfamoyl, N,N-diethylsulfamoyl); a sulfonyl group (e.g., methanesulfonyl, octanesulfonyl, benzenesulfonyl, toluenesulfonyl); an alkyloxycarbonyl group (e.g., methoxycarbonyl, butyloxy carbonyl); a heterocyclic oxy group (e.g., 1-phenyltetrazol-5-oxy, 2-tetrahydropyranyloxy); an azo group (e.g., phenylazo, 4-methoxyphenylazo, 4-pivaloylaminophenylazo, 2-hydroxy-4-propanoylphenylazo); an acyloxy group (e.g., acetoxy); a carbamoyloxy group (e.g., N-methylcarbamoyloxy, N-phenylcarbamoyloxy); a sylyloxy group (e.g., trimethylsilyloxy, dibutylmethylsilyloxy); an aryloxycarbonylamino group (e.g., phenoxycarbonylamino); an imide group (e.g., N-succinimide, N-phthalimide); a heterocyclic thio group (e.g., 2-Benzothiazolyl-thio, 2,4-di-phenoxy-1,3,5-triazole-6-thio, 2-pyridyldithio); a sulfinyl group (e.g., 3-phenoxypropylsulfinyl); a phosphonyl group (e.g., phenoxyphosphonyl, octyloxy phosphonyl, phenyl phosphonyl); an aryloxycarbonyl group (e.g., phenoxycarbonyl); an acyl group (e.g., acetyl, 3-phenylpropanoyl, benzoyl); an ionic hydrophilic group (e.g., a carboxyl group, a sulfo group, and quaternary ammonium groups); and other cyano groups, a hydroxyl group, a nitro group, and an amino group.

The coloring composition of the present invention contains a phthalocyanine dye presented by the following Formula (1), a phthalocyanine dye represented by the following Formula (2), and at least one preservative.

[Phthalocyanine Dye Represented by Formula (1)]

First, the phthalocyanine dye represented by the Formula (1) will be explained in detail.

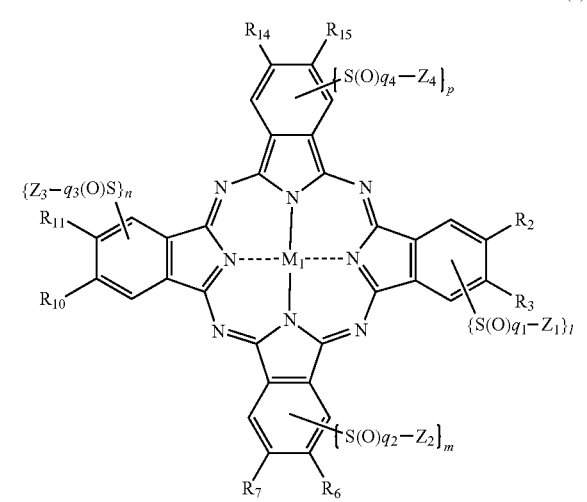

(1)

In Formula (1), $R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further have a substituent.

$Z_1$, $Z_2$, $Z_3$ and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. However, at least one of $Z_1$, $Z_2$, $Z_3$ and $Z_4$ has an ionic hydrophilic group as a substituent l, m, n, p, $q_1$, $q_2$, $q_3$ and $q_4$ each independently represent 1 or 2.

$M_1$ represents a hydrogen atom, a metal element, a metal oxide, a metal hydroxide, or a metal halide.

In Formula (1), $R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group. These groups may further have a substituent. The substituent may be Group A of substituents as described above.

Examples of the halogen atom represented by $R_2$, $R_3$, $R_6$, $R_7$, $R_{10}$, $R_{11}$, $R_{14}$ and $R_{15}$ include a fluorine atom, a chlorine atom and a bromine atom.

The alkyl group represented by $R_2$, $R_3$, $R_6$, $R_7$, $R_{10}$, $R_{11}$, $R_{14}$ and $R_{15}$ includes an alkyl group having a substituent and an unsubstituted alkyl group. The alkyl group is preferably an alkyl group having 1 to 12 carbon atoms when excluding the substituent. Examples of the substituent include a hydroxyl group, an alkoxy group, a cyano group, a halogen atom, and an ionic hydrophilic group. Examples of the alkyl group include methyl, ethyl, butyl, isopropyl, t-butyl, hydroxyethyl, methoxyethyl, cyanoethyl, trifluoromethyl, 3-sulfopropyl, and 4-sulfobutyl.

The cycloalkyl group represented by $R_2$, $R_3$, $R_6$, $R_7$, $R_{10}$, $R_{11}$, $R_{14}$ and $R_{15}$ includes a cycloalkyl group having a substituent and an unsubstituted cycloalkyl group. The cycloalkyl group is preferably a cycloalkyl group having 5 to 12 carbon atoms when excluding the substituent. Examples of the substituent include an ionic hydrophilic group. Examples of the cycloalkyl group include a cyclohexyl group.

The alkenyl group represented by $R_2$, $R_3$, $R_6$, $R_7$, $R_{10}$, $R_{11}$, $R_{14}$ and $R_{15}$ includes an alkenyl group having a substituent and an unsubstituted alkenyl group. The alkenyl group is preferably an alkenyl group having 2 to 12 carbon atoms when excluding the substituent. Examples of the substituent include an ionic hydrophilic group. Examples of the alkenyl group include a vinyl group, an allyl group, or the like.

The aralkyl group represented by $R_2$, $R_3$, $R_6$, $R_7$, $R_{10}$, $R_{11}$, $R_{14}$ and $R_{15}$ includes an aralkyl group having a substituent and an unsubstituted aralkyl group. The aralkyl group is preferably an aralkyl group having 7 to 12 carbon atoms when excluding the substituent. Examples of the substituent include an ionic hydrophilic group. Examples of the aralkyl group include a benzyl group and a 2-phenethyl group.

The aryl group represented by $R_2$, $R_3$, $R_6$, $R_7$, $R_{10}$, $R_{11}$, $R_{14}$ and $R_{15}$ includes an aryl group having a substituent and an unsubstituted aryl group. The aryl group is preferably an aryl group having 6 to 12 carbon atoms when excluding the substituent is preferred. Examples of the substituent include an alkyl group, an alkoxy group, a halogen atom, alkylamino group, and an ionic hydrophilic group. Examples of the aryl group include phenyl, p-tolyl, p-methoxyphenyl, o-chlorophenyl, and m-(3-sulfopropylamino)phenyl.

The heterocyclic group represented by $R_2$, $R_3$, $R_6$, $R_7$, $R_{10}$, $R_{11}$, $R_{14}$ and $R_{15}$ includes a heterocyclic group having a substituent and an unsubstituted heterocyclic group. The heterocyclic group is preferably a 5-membered or 6-membered heterocyclic group. Examples of the substituent include an ionic hydrophilic group. Examples of the heterocyclic group include a 2-piridyl group, a 2-thienyl group, and a 2-furyl group.

The alkylamino group represented by $R_2$, $R_3$, $R_6$, $R_7$, $R_{10}$, $R_{11}$, $R_{14}$ and $R_{15}$ includes an alkylamino group having a substituent and an unsubstituted alkylamino group. The alkylamino group is preferably an alkylamino group having 1 to 6 carbon atoms when excluding the substituent. Examples of the substituent include an ionic hydrophilic group. Examples of the alkylamino group include a methylamino group and a diethylamino group.

The alkoxy group represented by $R_2$, $R_3$, $R_6$, $R_7$, $R_{10}$, $R_{11}$, $R_{14}$ and $R_{15}$ includes an alkoxy group having a substituent and an unsubstituted alkoxy group. The alkoxy group is preferably an alkoxy group having 1 to 12 carbon atoms when excluding the substituent. Examples of the substituent include an alkoxy group, a hydroxyl group, and an ionic hydrophilic group. Examples of the alkoxy group include a methoxy group, an ethoxy group, an isopropoxy group, a methoxyethoxy group, a hydroxyethoxy group, and a 3-carboxypropoxy group.

The aryloxy group represented by $R_2$, $R_3$, $R_6$, $R_7$, $R_{10}$, $R_{11}$, $R_{14}$ and $R_{15}$ includes an aryloxy group having a substituent and an unsubstituted aryloxy group. The aryloxy group is preferably an aryloxy group having 6 to 12 carbon atoms when excluding the substituent. Examples of the substituent include an alkoxy group and an ionic hydrophilic group. Examples of the aryloxy group include a phenoxy group, a p-methoxyphenoxy group, and an o-methoxyphenoxy group.

The amide group represented by $R_2$, $R_3$, $R_6$, $R_7$, $R_{10}$, $R_{11}$, $R_{14}$ and $R_{15}$ includes an amide group having a substituent and an unsubstituted amide group. The amide group is preferably an amide group having 2 to 12 carbon atoms when excluding the substituent. Examples of the substituent include an ionic hydrophilic group. Examples of the amide group include an acetamide group, a propionamide group, a benzamide group, and a 3,5-disulfobenzamide group.

The arylamino group represented by $R_2$, $R_3$, $R_6$, $R_7$, $R_{10}$, $R_{11}$, $R_{14}$ and $R_{15}$ includes an arylamino group having a substituent and an unsubstituted arylamino group. The arylamino group is preferably an arylamino group having 6 to 12 carbon atoms when excluding the substituent. Examples of the substituent include a halogen atom and an ionic hydrophilic group. Examples of the arylamino group include an anilino group and a 2-chloroanilino group.

The ureido group represented by $R_2$, $R_3$, $R_6$, $R_7$, $R_{10}$, $R_{11}$, $R_{14}$ and $R_{15}$ includes an ureido group having a substituent and an unsubstituted ureido group. The ureido group is preferably an ureido group having 1 to 12 carbon atoms when excluding the substituent. Examples of the substituent include an alkyl group and an aryl group. Examples of the ureido group include a 3-methylureido group, a 3,3-dimethylureido group and a 3-phenylureido group.

The sulfamoylamino group represented by $R_2$, $R_3$, $R_6$, $R_7$, $R_{10}$, $R_{11}$, $R_{14}$ and $R_{15}$ includes a sulfamoylamino group having a substituent and an unsubstituted sulfamoylamino group. Examples of the substituent include an alkyl group. Example of the sulfamoylamino group include an N,N-dipropylsulfamoylamino group.

The alkylthio group represented by $R_2$, $R_3$, $R_6$, $R_7$, $R_{10}$, $R_{11}$, $R_{14}$ and $R_{15}$ includes an alkylthio group having a substituent and an unsubstituted alkylthio group. The alkylthio group is preferably an alkylthio group having 1 to 12 carbon atoms when excluding the substituent. Examples of the substituent include an ionic hydrophilic group. Examples of the alkylthio group include a methylthio group and an ethylthio group.

The arylthio group represented by $R_2$, $R_3$, $R_6$, $R_7$, $R_{10}$, $R_{11}$, $R_{14}$ and $R_{15}$ includes an arylthio group having a substituent and an unsubstituted arylthio group. The arylthio group is preferably an arylthio group having 6 to 12 carbon atoms when excluding the substituent. Examples of the substituent include an alkyl group and an ionic hydrophilic group. Examples of the arylthio group include a phenylthio group and a p-tolylthio group.

The alkoxycarbonylamino group represented by $R_2$, $R_3$, $R_6$, $R_7$, $R_{10}$, $R_{11}$, $R_{14}$ and $R_{15}$ includes an alkoxycarbonylamino group having a substituent and an unsubstituted alkoxycarbonylamino group. The alkoxycarbonylamino group is preferably an alkoxycarbonylamino group having 2 to 12 carbon atoms when excluding the substituent. Examples of the substituent include an ionic hydrophilic group. Examples of the alkoxycarbonylamino group include an ethoxycarbonylamino group.

The sulfonamide group represented by $R_2$, $R_3$, $R_6$, $R_7$, $R_{10}$, $R_{11}$, $R_{14}$ and $R_{15}$ includes a sulfonamide group having a substituent and an unsubstituted sulfonamide group. The sulfonamide group is preferably a sulfonamide group having 1 to 12 carbon atoms when excluding the substituent. Examples of the substituent include an ionic hydrophilic group. Examples of the sulfonamide group include methanesulfonamide, benzenesulfonamide, and 3-carboxybenzenesulfonamide.

The carbamoyl group represented by $R_2$, $R_3$, $R_6$, $R_7$, $R_{10}$, $R_{11}$, $R_{14}$ and $R_{15}$ includes a carbamoyl group having a substituent and an unsubstituted carbamoyl group. Examples of the substituent include an alkyl group. Examples of the carbamoyl group include a methylcarbamoyl group and a dimethylcarbamoyl group.

The sulfamoyl group represented by $R_2$, $R_3$, $R_6$, $R_7$, $R_{10}$, $R_{11}$, $R_{14}$ and $R_{15}$ includes a sulfamoyl group having a substituent and an unsubstituted sulfamoyl group. Examples of the substituent include an alkyl group and an aryl group. Examples of the sulfamoyl group include a dimethylsulfamoyl group and a di-(2-hydroxyethyl)sulfamoyl group, and a phenylsulfamoyl group.

The alkoxycarbonyl group represented by $R_2$, $R_3$, $R_6$, $R_7$, $R_{10}$, $R_{11}$, $R_{14}$ and $R_{15}$ includes an alkoxycarbonyl group having a substituent and an unsubstituted alkoxycarbonyl group. The alkoxycarbonyl group is preferably an alkoxycarbonyl group having 2 to 12 carbon atoms when excluding the substituent. Examples of the substituent include an ionic hydrophilic group. Examples of the alkoxycarbonyl group include a methoxycarbonyl group and an ethoxycarbonyl group.

The heterocyclic oxy group represented by $R_2$, $R_3$, $R_6$, $R_7$, $R_{10}$, $R_{11}$, $R_{14}$ and $R_{15}$ includes a heterocyclic oxy group having a substituent and an unsubstituted heterocyclic oxy group. The heterocyclic oxy group is preferably a heterocyclic oxy group having a 5-membered or 6-membered heterocyclic ring. Examples of the substituent include a hydroxyl group and an ionic hydrophilic group. Examples of the heterocyclic oxy group include a 2-tetrahydropyranyl oxy group.

The azo group represented by $R_2$, $R_3$, $R_6$, $R_7$, $R_{10}$, $R_{11}$, $R_{14}$ and $R_{15}$ includes an azo group having a substituent and an unsubstituted azo group. Examples of the azo group include a p-nitrophenylazo group.

The acyloxy group represented by $R_2$, $R_3$, $R_6$, $R_7$, $R_{10}$, $R_{11}$, $R_{14}$ and $R_{15}$ includes an acyloxy group having a substituent and an unsubstituted acyloxy group. The acyloxy group is preferably an acyloxy group having 1 to 12 carbon atoms when excluding the substituent. Examples of the substituent include an ionic hydrophilic group. Examples of the acyloxy group include an acetoxy group and a benzoyloxy group.

The carbamoyloxy group represented by $R_2$, $R_3$, $R_6$, $R_7$, $R_{10}$, $R_{11}$, $R_{14}$ and $R_{15}$ includes a carbamoyloxy group having a substituent and an unsubstituted carbamoyloxy group. Example of the substituent includes an alkyl group. Examples of the carbamoyloxy group include an N-methylcarbamoyloxy group.

The silyloxy group represented by $R_2$, $R_3$, $R_6$, $R_7$, $R_{10}$, $R_{11}$, $R_{14}$ and $R_{15}$ includes a silyloxy group having a substituent and an unsubstituted silyloxy group. Examples of the substituent include an alkyl group. Examples of the silyloxy group include a trimethyl silyloxy group.

The aryloxycarbonyl group represented by $R_2$, $R_3$, $R_6$, $R_7$, $R_{10}$, $R_{11}$, $R_{14}$ and $R_{15}$ includes an aryloxycarbonyl group having a substituent and an unsubstituted aryloxycarbonyl group. The aryloxycarbonyl group is preferably an aryloxycarbonyl group having 7 to 12 carbon atoms when excluding the substituent. Examples of the substituent include an ionic hydrophilic group. Examples of the aryloxycarbonyl group include a phenoxycarbonyl group.

The aryloxycarbonylamino group represented by $R_2$, $R_3$, $R_6$, $R_7$, $R_{10}$, $R_{11}$, $R_{14}$ and $R_{15}$ includes an aryloxycarbonylamino group having a substituent and an unsubstituted aryloxycarbonylamino group. The aryloxycarbonylamino group is preferably an aryloxycarbonylamino group having 7 to 12 carbon atoms when excluding the substituent. Examples of the substituent include an ionic hydrophilic group. Examples of the aryloxycarbonylamino group include a phenoxycarbonylamino group.

The imide group represented by $R_2$, $R_3$, $R_6$, $R_7$, $R_{10}$, $R_{11}$, $R_{14}$ and $R_{15}$ includes an imide group having a substituent and an unsubstituted imide group. Examples of the imide group include an N-phthalimide group and an N-succinimide group.

The heterocyclic thio group represented by $R_2$, $R_3$, $R_6$, $R_7$, $R_{10}$, $R_{11}$, $R_{14}$ and $R_{15}$ includes a heterocyclic thio group having a substituent and an unsubstituted heterocyclic thio group. The heterocyclic thio group is preferably a heterocyclic thio group having a 5-membered or 6-membered heterocyclic ring. Examples of the substituent include an ionic hydrophilic group. Examples of the heterocyclic thio group include a 2-pyridylthio group.

The phosphoryl group represented by $R_2$, $R_3$, $R_6$, $R_7$, $R_{10}$, $R_{11}$, $R_{14}$ and $R_{15}$ includes a phosphoryl group having a substituent and an unsubstituted phosphoryl group. Examples of the phosphoryl group include a phenoxyphosphoryl group and a phenylphosphoryl group.

The acyl group represented by $R_2$, $R_3$, $R_6$, $R_7$, $R_{10}$, $R_{11}$, $R_{14}$ and $R_{15}$ includes an acyl group having a substituent and an unsubstituted acyl group. The acyl group is preferably an aryl group having 1 to 12 carbon atoms when excluding the substituent. Examples of the substituent include an ionic hydrophilic group. Examples of the acyl group include an acetyl group and a benzoyl group.

The ionic hydrophilic group represented by $R_2$, $R_3$, $R_6$, $R_7$, $R_{10}$, $R_{11}$, $R_{14}$ and $R_{15}$ includes a sulfo group, a carboxyl group, a quaternary ammonium group, and the like. The ionic hydrophilic group is preferably a sulfo group and a carboxyl group, and particularly preferably a sulfo group. The carboxyl group and the sulfo group may be in the form of a salt, and examples of a counter ion for forming the salt include an alkali metal ion (e.g., sodium ion, potassium ion) and organic cations (e.g., tetramethylguanidium ions).

$R_2$, $R_3$, $R_6$, $R_7$, $R_{10}$, $R_{11}$, $R_{14}$ and $R_{15}$ are preferably a hydrogen atom, a halogen atom, an alkyl group, an aryl group, a cyano group, an alkoxy group, an amide group, an ureido group, a sulfonamide group, a carbamoyl group, a sulfamoyl group, and an alkoxycarbonyl group, particularly preferably a hydrogen atom, a halogen atom, and a cyano group, and most preferably a hydrogen atom.

In Formula (1), $Z_1$, $Z_2$, $Z_3$ and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group. However, at least one of $Z_1$, $Z_2$, $Z_3$ and $Z_4$ has an ionic hydrophilic group as a substituent. Examples of the substituent include the substituent described in the above-mentioned Group A of substituents.

The alkyl group represented by $Z_1$, $Z_2$, $Z_3$ and $Z_4$ includes an alkyl group having a substituent and an unsubstituted alkyl group. The alkyl group is preferably an alkyl group having 1 to 12 carbon atoms when excluding the substituent. Examples of the substituent include a hydroxyl group, an alkoxy group, a cyano group, an alkylamino group (RNH—, RR'N—), a carbamoyl group (—CONHR), a sulfamoyl group (—SO$_2$NHR, —SO$_2$NRR'), a sulfonylamino group (—NHSO$_2$R), a —SONHR group, a —SONRR' group, a halogen atom, and an ionic hydrophilic group (In addition, R and R' represent an alkyl group and a phenyl group, and they may also have a substituent. Examples of the substituent include an alkylamino group, a hydroxyl group, an ionic hydrophilic group, or the like. R and W may form a ring by a chemical bond). Examples of the alkyl group include methyl, ethyl, butyl, n-propyl, isopropyl, t-butyl, hydroxyethyl, methoxyethyl, cyanoethyl, trifluoromethyl, 3-sulfopropyl, and 4-sulfobutyl.

The cycloalkyl group represented by $Z_1$, $Z_2$, $Z_3$ and $Z_4$ includes a cycloalkyl group having a substituent and an unsubstituted cycloalkyl group. The cycloalkyl group is preferably a cycloalkyl group having 5 to 12 carbon atoms when excluding the substituent. Examples of the substituent include an ionic hydrophilic group. Examples of the cycloalkyl group include a cyclohexyl group.

The alkenyl group represented by $Z_1$, $Z_2$, $Z_3$ and $Z_4$ includes an alkenyl group having a substituent and an unsubstituted alkenyl group. The alkenyl group is preferably an alkenyl group having 2 to 12 carbon atoms when excluding the substituent. Examples of the substituent include an ionic hydrophilic group. Examples of the alkenyl group include a vinyl group, an allyl group, or the like.

The aralkyl group represented by $Z_1$, $Z_2$, $Z_3$ and $Z_4$ includes an aralkyl group having a substituent and an unsubstituted aralkyl group. The aralkyl group is preferably an aralkyl group having 7 to 12 carbon atoms when excluding the substituent. Examples of the substituent include an ionic hydrophilic group. Examples of the aralkyl group include a benzyl group and a 2-phenethyl group.

The aryl group represented by $Z_1$, $Z_2$, $Z_3$ and $Z_4$ includes an aryl group having a substituent and an unsubstituted aryl group. The aryl group is preferably an aryl group having 6 to 12 carbon atoms when excluding the substituent. Examples of the aryl group include phenyl, p-tolyl, p-methoxyphenyl, o-chlorophenyl, m-(3-sulfopropylamino) phenyl, and m-sulfophenyl. Examples of the substituent include an alkyl group (R—), an alkoxy group (RO—), an alkylamino group (RNH—, RR'N—), a carbamoyl group (—CONHR), a sulfamoyl group (—SO$_2$NHR), a sulfonylamino group (—NHSO$_2$R), a halogen atom, and an ionic hydrophilic group (further, R and R' represent an alkyl group and a phenyl group, and R and R' may have an ionic hydrophilic group.)

The heterocyclic group represented by $Z_1$, $Z_2$, $Z_3$ and $Z_4$ includes a heterocyclic group having a substituent and an unsubstituted heterocyclic group, and furthermore, the heterocyclic group may form a condensed ring with another ring. The heterocyclic group is preferably a 5-membered or 6-membered heterocyclic group. The heterocyclic group may also form a condensed ring with another ring. Examples of the heterocyclic group, if the substitution position of the heterocyclic ring is not limited, each independently include imidazole, benzimidazole, pyrazole, benzopyrazole, triazole, thiazole, benzothiazole, isothiazole, benzisothiazole, oxazole, benzoxazole, thiadiazole, oxadiazole, pyrrole, benzo pyrrole, indole, isoxazole, benzisoxazole, thiophene, benzothiophene, furan, benzofuran, pyridine, quinoline, isoquinoline, pyridazine, pyrimidine, pyrazine, cinnoline, phthalazine, quinazoline, quinoxaline, triazine, and the like. Examples of the substituent include an alkyl group (R—), an aryl group (R—), an alkoxy group (RO—), an alkylamino group (RNH—, RR'N—), a carbamoyl group (—CONHR), a sulfamoyl group (—SO$_2$NHR), a sulfonylamino group (—NHSO$_2$R), a sulfonyl group (—SO$_2$R), an acylamino group (—NHCOR), a halogen atom, and an ionic hydrophilic group (further, R and R' represent an alkyl group and an aryl group, and R and R' may have an ionic hydrophilic group or a substituent having an ionic hydrophilic group).

$Z_1$, $Z_2$, $Z_3$ and $Z_4$ are preferably a substituted or unsubstituted alkyl group, a substituted or unsubstituted aryl group, and a substituted or unsubstituted heterocyclic group, more preferably a substituted alkyl group, a substituted aryl group, and a substituted heterocyclic group, and still more preferably a substituted alkyl group.

At least one of $Z_1$, $Z_2$, $Z_3$ and $Z_4$ has an ionic hydrophilic group as a substituent. Examples of the ionic hydrophilic group as a substituent include a sulfo group, a carboxyl group, a quaternary ammonium group, or the like. The ionic hydrophilic group is preferably a carboxyl group and a sulfo group, and particularly preferably a sulfo group. The carboxyl group and the sulfo group may be in the form of a salt, and examples of the counter ion for forming the salt include an alkali metal ion (e.g., sodium ion, potassium ion) and organic cations (e.g., tetramethylguanidium ions).

Preferably, $Z_1$, $Z_2$, $Z_3$, and $Z_4$ each independently represent a group represented by the following Formula (3) or the following Formula (4).

(3)

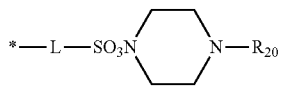

(4)

In the Formulas (3) and (4), L represents an alkylene group having 1 to 12 carbon atoms. $M^3$ represents a hydrogen atom or a counter cation, and $R_{20}$ represents an alkyl group having 1 to 6 carbon atoms. * represents a bond.

In Formulas (3) and (4), L represents an alkylene group having 1 to 12 carbon atoms, preferably an alkylene group having 1 to 8 carbon atoms, more preferably an alkylene group having 1 to 6 carbon atoms, and still more preferably an alkylene group having 1 to 3 carbon atoms.

In Formula (3), $M^3$ represents a hydrogen atom or a counter cation. If $M^3$ is a hydrogen atom, it is a free acid form. If $M^3$ is a counter cation, it is a salt form. Examples of the counter cation forming a salt may include a monovalent counter cation, and preferably an alkali metal ion, an ammonium ion, an organic cation, and the like. Examples of the organic cation may include a tetramethylammonium ion, a tetramethylguanidium ion, tetramethylphosphonium, and the like. The counter cation is preferably an alkali metal ion, and more preferably a lithium ion, a sodium ion, and a potassium ion.

In Formula (4), $R_{20}$ represents an alkyl group having 1 to 6 carbon atoms, preferably an alkyl group having 1 to 4 carbon atoms, and more preferably a methyl group.

In Formula (1), l, m, n and p each independently represent 1 or 2. That is, $4 \leq l+m+n+p \leq 8$ is satisfied. Preferably, $4 \leq l+m+n+p \leq 6$ is satisfied, and most preferably, each is 1 (l=m=n=p=1).

In Formula (1), $q_1$, $q_2$, $q_3$ and $q_4$ each independently represent 1 or 2. In particular, $q_1=q_2=q_3=q_4=2$ is preferred.

In Formula (1), $M_1$ represents a hydrogen atom, a metal element, a metal oxide, a metal hydroxide or a metal halide.

Preferred examples of $M_1$ include, in addition to the hydrogen atom, a metal element such as Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, and Bi. Among them, Cu, Ni, Zn, Al, and the like are particularly preferred, and Cu is most preferred. Preferred examples of the metal oxide may include VO, GeO, and the like. Further, preferred examples of the metal hydroxide may include $Si(OH)_2$, $Cr(OH)_2$, $Sn(OH)_2$, and the like. Moreover, examples of the metal halide may include $AlCl$, $SiCl_2$, $VCl$, $VCl_2$, $VOCl$, $FeCl$, $GaCl$, $ZrCl$, and the like.

[Phthalocyanine Dye Represented by Formula (2)]

Next, the phthalocyanine dye represented by Formula (2) will be described in detail.

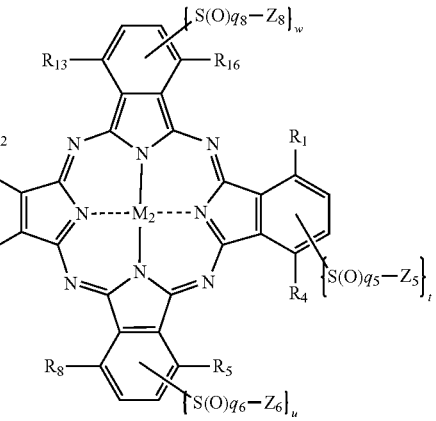

(2)

In Formula (2), $R_1$, $R_4$, $R_5$, $R_8$, $R_9$, $R_{12}$, $R_{13}$ and $R_{16}$ are each independently the same as $R_2$, $R_3$, $R_6$, $R_7$, $R_{10}$, $R_{11}$, $R_{14}$ and $R_{15}$ in Formula (1).

$Z_5$, $Z_6$, $Z_7$ and 4 are each independently the same as $Z_1$, $Z_2$, $Z_3$ and $Z_4$ in Formula (1).

t, u, v, w, $q_5$, $q_6$, $q_7$ and $q_8$ each independently represent 1 or 2.

$M_2$ is the same as $M_1$ in Formula (1).

$R_1$, $R_4$, $R_5$, $R_8$, $R_9$, $R_{12}$, $R_{13}$ and $R_{16}$ are each independently the same as $R_2$, $R_3$, $R_6$, $R_7$, $R_{10}$, $R_{11}$, $R_{14}$ and $R_{15}$ in Formula (1), and a hydrogen atom, a halogen atom, an alkyl group, an aryl group, a cyano group, an alkoxy group, an amide group, a ureido group, a sulfonamide group, a carbamoyl group, a sulfamoyl group and an alkoxycarbonyl group are preferred; particularly, a hydrogen atom, a halogen atom, and a cyano group are more preferred; and a hydrogen atom is most preferred.

Such groups may also have a substituent. Examples of the substituent include the substituents described in the above-mentioned Group A of substituents.

$Z_5$, $Z_6$, $Z_7$ and $Z_8$ are each independently the same as $Z_5$, $Z_6$, $Z_7$ and $Z_8$ in Formula (1).

$Z_5$, 4, $Z_7$ and $Z_8$ are preferably a substituted or unsubstituted alkyl group, a substituted or unsubstituted aryl group, and a substituted or unsubstituted heterocyclic group, more preferably a substituted alkyl group, a substituted aryl group, and a substituted heterocyclic group, and still more preferably a substituted alkyl group. Further, at least one of the substituents of the substituted alkyl group is most preferably a —$SO_2NHR$ group (R preferably represents a substituted or unsubstituted alkyl group, or a substituted or unsubstituted phenyl group) in terms of ozone fastness.

The ionic hydrophilic group that at least one of $Z_5$, $Z_6$, $Z_7$ and $Z_8$ has as a substituent is the same as the ionic hydrophilic group that $Z_1$, $Z_2$, $Z_3$ and $Z_4$ in Formula (1) have as a substituent, and the preferred examples are also the same.

Preferably, $Z_5$, $Z_6$, $Z_7$ and $Z_8$ each independently represent a group represented by Formula (3) or Formula (4). In a case where $Z_5$, $Z_6$, $Z_7$ and $Z_8$ are a group represented by Formula (3) or Formula (4), preferred ranges of L, $M^3$, and $R_{20}$ in Formulas (3) and (4) are the same as described above.

In addition, at least one of $Z_5$, $Z_6$, $Z_7$ and $Z_8$ is preferably a group represented by the following Formula (5), and one of $Z_5$, $Z_6$, $Z_7$ and $Z_8$ is more preferably a group represented by the following Formula (5).

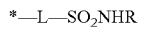

(5)

In Formula (5), L represents an alkylene group having 1 to 12 carbon atoms, and R represents a substituted or unsubstituted alkyl group, or a substituted or unsubstituted phenyl group. * represents a bond.

In Formula (5), L represents an alkylene group having 1 to 12 carbon atoms, preferably an alkylene group having 1 to 8 carbon atoms, more preferably an alkylene group having 1 to 6 carbon atoms, and still more preferably an alkylene group having 1 to 3 carbon atoms.

In Formula (5), R represents a substituted or unsubstituted alkyl group, or a substituted or unsubstituted phenyl group, and preferably a substituted or unsubstituted alkyl group having 1 to 6 carbon atoms, or a substituted or unsubstituted phenyl group. The alkyl group or the phenyl group may preferably have a hydroxyl group.

In Formula (2), t, u, v and w each independently represent 1 or 2. That is, $4 \leq t+u+v+w \leq 8$ is satisfied. Preferably, $4 \leq t+u+v+w \leq 6$ is satisfied, and most preferably, each is 1 (t=u=v=w=1).

In Formula (2), $q_5$, $q_6$, $q_7$ and $q_8$ each independently represent 1 or 2. In particular, $q_5=q_6=q_7=q_8=2$ is preferred.

$M_2$ is the same as $M_1$ in Formula (1), and the preferred examples are also the same.

[Synthesis of Phthalocyanine Dye]

The phthalocyanine derivatives used in the present invention are described, for example, in Shirai Kobayashi, et al., "Phthalocyanine—Chemistry and Function —," pp. 1-62, IPC Co., Ltd., C. C. Leznoff and A. B. P. Lever, "Phthalocyanines Properties and Applications," pp. 1-54, VCH, etc., and may be synthesized by citing such publications or combining similar methods.

The compound represented by Formula (1) may be synthesized in reference with the descriptions in paragraphs [0057] to [0074] of Japanese Patent Application Laid-Open No. 2005-307189.

The compound represented by Formula (2) may be synthesized in reference with the descriptions in paragraphs [0086] to [0093] of Japanese Patent Application Laid-Open No. 2006-124679.

Hereinafter, the synthesis of the phthalocyanine dye represented by Formula (2) will be described as an example.

Among the phthalocyanine dyes represented by Formula (2) of the present invention, the compound in which $R_1$, $R_4$, $R_5$, $R_8$, $R_9$, $R_{12}$, $R_{13}$ and $R_{16}$ are hydrogen, and $q_5$, $q_6$, $q_7$ and $q_8$ are 2 may be synthesized for example, by reacting a phthalonitrile derivative represented by the following Formula (V) and/or a diiminoisoindoline derivative represented by the following Formula (VI) and a metal derivative represented by the following Formula M-(Y)d.

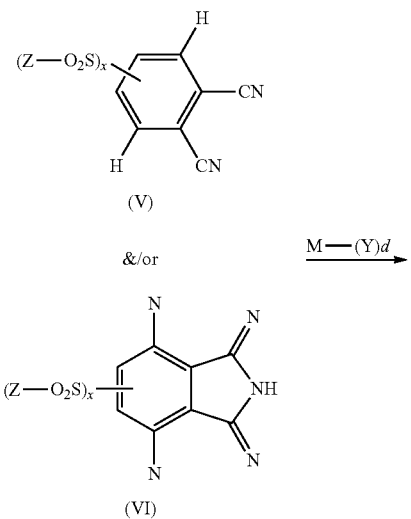

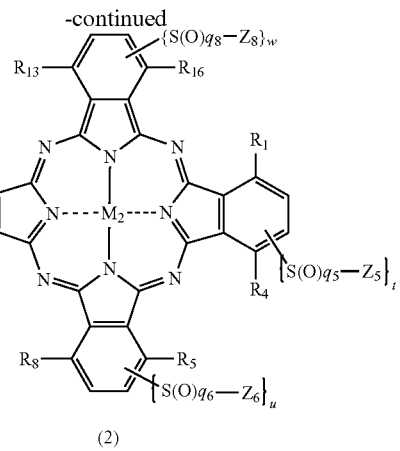

In Formula (2), $R_1$, $R_4$, $R_5$, $R_8$, $R_9$, $R_{12}$, $R_{13}$ and $R_{16}$ are each independently the same as $R_2$, $R_3$, $R_6$, $R_7$, $R_{10}$, $R_{11}$, $R_{14}$ and $R_{15}$ in Formula (1).

$Z_5$, $Z_6$, $Z_7$ and $Z_8$ are each independently the same as $Z_1$, $Z_2$, $Z_3$ and $Z_4$ in Formula (1).

t, u, v, w, $q_5$, $q_6$, $q_7$ and $q_8$ each independently represent 1 or 2.

M and $M_2$ are the same as $M_1$ in Formula (1), and $M=M_2$.

The x in Formula (V) and/or Formula (VI) is the same as t, u, v, and w in Formula (2). Z represents a substituent corresponding to $Z_5$, $Z_6$, $Z_7$ and $Z_8$.

Y represents a monovalent or divalent ligand such as a halogen atom, an acetate anion, an acetylacetonate, and oxygen, and d is an integer of 1 to 4.

Examples of the metal derivative represented by M-(Y)d may include halides, carboxylic acid derivatives, sulfates, nitrates, carbonyl compounds, oxides, complexes, and the like of Al, Si, Ti, V, Mn, Fe, Co, Ni, Cu, Zn, Ge, Ru, Rh, Pd, In, Sn, Pt, and Pb. Specific examples thereof may include copper chloride, copper bromide, copper iodide, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxy trichloride, palladium chloride, palladium acetate, aluminum chloride, manganese chloride, manganese acetate, acetylacetone manganese, manganese chloride, lead chloride, lead acetate, indium chloride, titanium chloride, tin chloride, and the like.

As for the used amounts of the metal derivatives and the phthalonitrile compound represented by Formula (V), a molar ratio of 1:3 to 1:6 is preferred. Further, as for the used amounts of the metal derivatives and the diiminoisoindiline derivatives represented by Formula (VI), a molar ratio of 1:3 to 1:6 is preferred.

The reaction is usually performed in the presence of solvents. As the solvent, an organic solvent having a boiling point of 80° C. or more, preferably 130° C. or more is used. Examples thereof may include n-amyl alcohol, n-quisanol, cyclohexanol, 2-methyl-1-pentanol, 1-heptanol, 2-heptanol, 1-octanol, 2-ethylhexanol, benzyl alcohol, ethylene glycol, propylene glycol, ethoxy ethanol, propoxy ethanol, butoxy ethanol, dimethylamino ethanol, diethylamino ethanol, trichlorobenzene, chloronaphthalene, sulfolane, nitrobenzene, quinoline, urea, and the like. The amount of the solvent used is 1 to 100 times by mass, preferably 5 to 20 times by mass of the phthalonitrile compound.

In the reaction, 1,8-diazabicyclo[5.4.0]-7-undecene (DBU) or ammonium molybdate may be added as a catalyst. The added amount is 0.1 times by mole to 10 times by mole, preferably 0.5 times by mole to 2 times by mole based on 1 mole of the phthalonitrile compound and/or diiminoisoindoline derivatives.

The reaction temperature is in the range of 80° C. to 300° C., preferably in the range of 100° C. to 250° C., more preferably in the range of 130° C. to 230° C. If the temperature is less than 80° C., the reaction rate is extremely slow. If the temperature exceeds 300° C., the decomposition of the phthalocyanine compound is likely to occur.

The reaction time is in the range of 2 to 20 hours, preferably in the range of 5 to 15 hours, and more preferably in the range of 5 to 10 hours. If the reaction time is less than 2 hours, the unreacted raw materials are left in abundance. If the reaction time exceeds 20 hours, the decomposition of the phthalocyanine compound is likely to occur.

The product obtained by such a reaction is treated according to the method of post-processing of a conventional organic synthetic reaction, and purified or not purified before being used as a product. That is, for example, the thing which is liberated from the reaction system is not purified, or the operation of purification by recrystallization or column chromatography (e.g., gel permeation chromatography (SEPHADEX™ LH-20: manufactured by Pharmacia Co.) is performed alone or in combination with other processes to provide the products. After completion of the reaction, the reaction solvent is distilled off, or poured onto water or ice without distilling off, or neutralized or not neutralized, and the thing liberated is not purified, or the operation of purification is performed alone or in combination with other processes by recrystallization or column chromatography to provide the products. Further, after completion of the reaction, the reaction solvent is distilled off, or poured onto water or ice without distilling off, or neutralized or not neutralized, and the thing extracted with an organic solvent/water solution is not purified, or the operation of purification is performed alone or in combination with other processes by crystallization or column chromatography to provide the products.

In the thus-obtained phthalocyanine dye represented by Formula (2), the phthalocyanine compounds (e.g., in the case of t=u=v=w=1) in which $R_1$, $R_4$, $R_5$, $R_8$, $R_9$, $R_{12}$, $R_{13}$ and $R_{16}$ are hydrogen, and $q_5$, $q_6$, $q_7$ and $q_8$ are 2 are usually isomers in each substitution position of Ra(SO$_2$—Z$_5$), Rb(SO$_2$—Z$_6$), Rc(SO$_2$—Z$_7$), Rd(SO$_2$—Z$_8$), which are a mixture of compounds represented by the following Formulas (a)-1 to (a)-4.

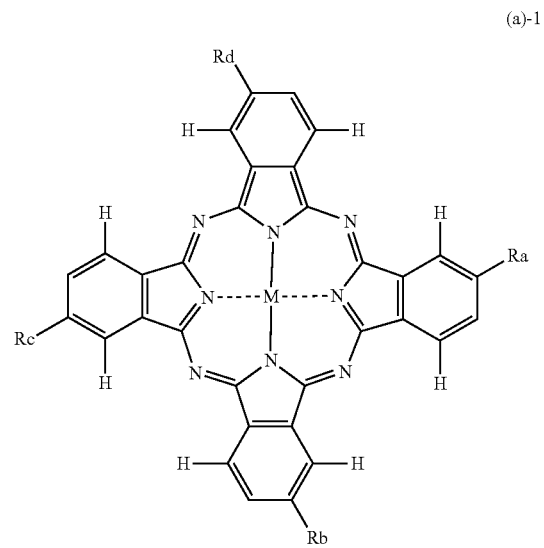

(a)-1

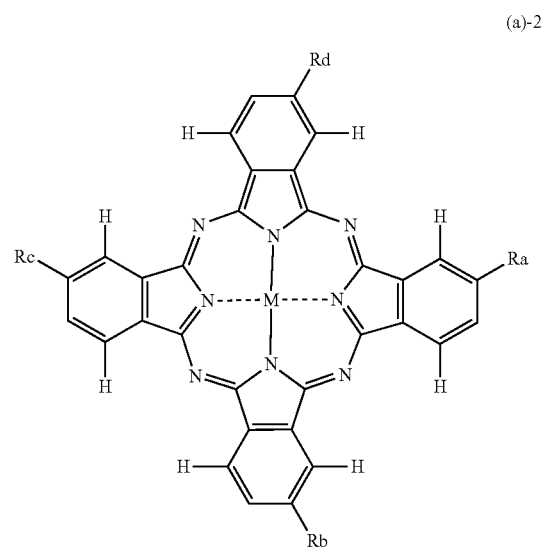

(a)-2

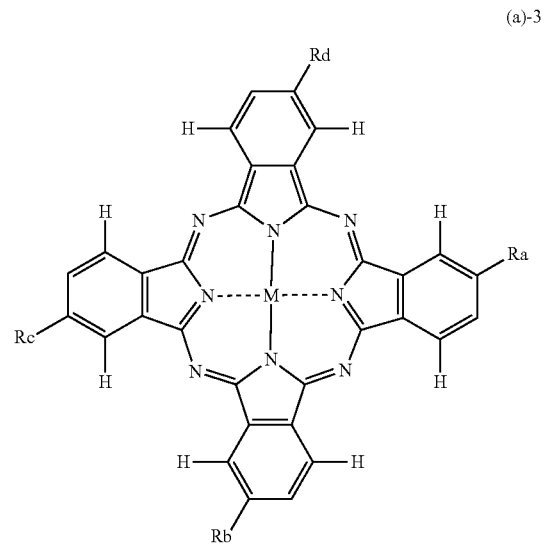

(a)-3

-continued

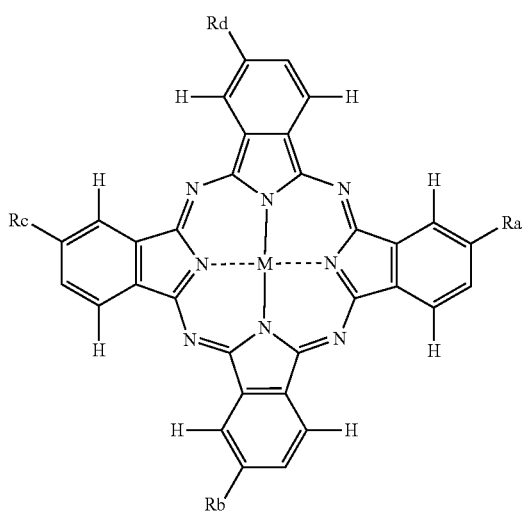

(a)-4

That is, the compound represented by Formulas (a)-1 to (a)-4 is β-substituted type (a phthalocyanine compound having a specific substituent at the 2- and/or 3-positions, the 6- and/or 7-positions, the 10- and/or 11-positions, and the 14- and/or 15-positions where $R_1$ to $R_{16}$ of the following Formula (IV) each correspond to the 1- to 16-positions).

The phthalocyanine dye represented by Formula (1) of the present invention corresponds to α-substituted type (a phthalocyanine compound having a specific substituent at the 1- and/or 4-positions, the 5- and/or 8-positions, the 9- and/or 12-positions, and the 13- and/or 16-positions), and the phthalocyanine dye represented by Formula (2) corresponds to n-substituted type (a phthalocyanine compound having a specific substituent at the 2- and/or 3-positions, the 6- and/or 7-positions, the 10- and/or 11-positions, and the 14- and/or 15-positions). In the present invention, even in any substituted type, it is important to have a specific substituent represented by —SO—Z and/or —SO$_2$—Z for good fastness.

Specific examples of the phthalocyanine dye represented by Formula (1) or Formula (2) are illustrated by using the following Formula (IV), but the phthalocyanine dye used in the present invention is not limited to the following examples.

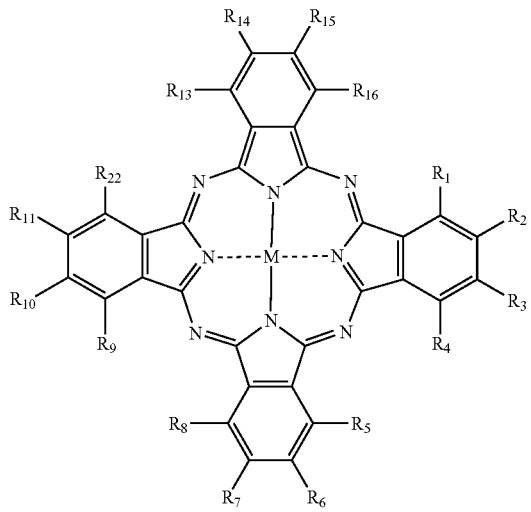

(IV)

(Examples of Phthalocyanine Dye Represented by Formula (1))

TABLE 1

In the table, specific examples of each set of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are each independently listed in a random order.

| Exemplary Compound | M | $R_1R_4$ | $R_2R_3$ | $R_5R_8$ | $R_6R_7$ |
|---|---|---|---|---|---|
| 101 α | Cu | H, —SO—(CH$_2$)$_3$SO$_3$Na | H, H | H, —SO—(CH$_2$)$_3$SO$_3$Na | H, H |
| 102 α | Cu | H, —SO$_2$—(CH$_2$)$_3$SO$_3$Na | H, H | H, —SO$_2$—(CH$_2$)$_3$SO$_3$Na | H, H |
| 103 α | Cu | H, —SO—⟨⟩—O(CH$_2$)$_4$SO$_3$Na | H, H | H, —SO—⟨⟩—O(CH$_2$)$_4$SO$_3$Na | H, H |
| 104 α | Cu | H, —SO$_2$—⟨⟩—O(CH$_2$)$_4$SO$_3$Na | H, H | H, —SO$_2$—⟨⟩—O(CH$_2$)$_4$SO$_3$Na | H, H |
| 105 α | Cu | —SO—(CH$_2$)$_3$SO$_3$Na, —SO—(CH$_2$)$_3$SO$_3$Na | H, H | —SO—(CH$_2$)$_3$SO$_3$Na, —SO—(CH$_2$)$_3$SO$_3$Na | H, H |
| 106 α | Cu | —SO$_2$—(CH$_2$)$_3$SO$_3$Na, —SO$_2$—(CH$_2$)$_3$SO$_3$Na | H, H | —SO$_2$—(CH$_2$)$_3$SO$_3$Na, —SO$_2$—(CH$_2$)$_3$SO$_3$Na | H, H |

| Exemplary Compound | $R_9R_{12}$ | $R_{10}R_{11}$ | $R_{13}R_{16}$ | $R_{14}R_{15}$ |
|---|---|---|---|---|
| 101 α | H, —SO—(CH$_2$)$_3$SO$_3$Na | H, H | H, —SO—(CH$_2$)$_3$SO$_3$Na | H, H |

TABLE 1-continued

In the table, specific examples of each set of (R₁R₄) (R₂R₃) (R₅R₈) (R₆R₇) (R₉R₁₂) (R₁₀R₁₁) (R₁₃R₁₆) (R₁₄R₁₅)
are each independently listed in a random order.

| | | | | |
|---|---|---|---|---|
| 102 α | H, —SO₂—(CH₂)₃SO₃Na | H, H | H, —SO₂—(CH₂)₃SO₃Na | H, H |
| 103 α | H, —SO—C₆H₄—O(CH₂)₄SO₃Na | H, H | H, —SO—C₆H₄—O(CH₂)₄SO₃Na | H, H |
| 104 α | H, —SO₂—C₆H₄—O(CH₂)₄SO₃Na | H, H | H, —SO₂—C₆H₄—O(CH₂)₄SO₃Na | H, H |
| 105 α | —SO—(CH₂)₃SO₃Na, —SO—(CH₂)₃SO₃Na | H, H | —SO—(CH₂)₃SO₃Na, —SO—(CH₂)₃SO₃Na | H, H |
| 106 α | —SO₂—(CH₂)₃SO₃Na, —SO₂—(CH₂)₃SO₃Na | H, H | —SO₂—(CH₂)₃SO₃Na, —SO₂—(CH₂)₃SO₃Na | H, H |

TABLE 2

In the table, specific examples of each set of (R₁R₄) (R₂R₃) (R₅R₈) (R₆R₇) (R₉R₁₂) (R₁₀R₁₁) (R₁₃R₁₆) (R₁₄R₁₅)
are each independently listed in a random order.

| Exemplary Compound | M | R₁R₄ | R₂R₃ | R₅R₈ | R₆R₇ |
|---|---|---|---|---|---|
| 107 α | Cu | H, —SO—C₆H₄—NHSO₂—C₆H₄—SO₃Na | H, H | H, —SO—C₆H₄—NHSO₂—C₆H₄—SO₃Na | H, H |
| 108 α | Cu | H, —SO₂—C₆H₄—NHSO₂—C₆H₄—SO₃Na | H, H | H, —SO₂—C₆H₄—NHSO₂—C₆H₄—SO₃Na | H, H |
| 109 α | Cu | H, —SO—C₆H₄(SO₂NH—C₆H₄—SO₃K) | H, H | H, —SO—C₆H₄(SO₂NH—C₆H₄—SO₃K) | H, H |
| 110 α | Cu | H, —SO₂—C₆H₄(SO₂NH—C₆H₄—SO₃K) | H, H | H, —SO₂—C₆H₄(SO₂NH—C₆H₄—SO₃K) | H, H |

TABLE 2-continued

| Exemplary Compound | $R_9R_{12}$ | $R_{10}R_{11}$ | $R_{13}R_{16}$ | $R_{14}R_{15}$ |
|---|---|---|---|---|
| 107 α | H, —SO—C6H4—NHSO2—C6H4—SO3Na | H, H | H, —SO—C6H4—NHSO2—C6H4—SO3Na | H, H |
| 108 α | H, —SO2—C6H4—NHSO2—C6H4—SO3Na | H, H | H, —SO2—C6H4—NHSO2—C6H4—SO3Na | H, H |
| 109 α | H, —SO—C6H4(SO2NH—C6H4—SO3K) | H, H | H, —SO—C6H4(SO2NH—C6H4—SO3K) | H, H |
| 110 α | H, —SO2—C6H4(SO2NH—C6H4—SO3K) | H, H | H, —SO2—C6H4(SO2NH—C6H4—SO3K) | H, H |

TABLE 3

In the table, specific examples of each set of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are each independently listed in a random order.

| Exemplary Compound | M | $R_1R_4$ | $R_2R_3$ | $R_5R_8$ | $R_6R_7$ |
|---|---|---|---|---|---|
| 111 α | Cu | H, —SO—C6H4(CONH—C6H3(SO3K)2) | H, H | H, —SO—C6H4(CONH—C6H3(SO3K)2) | H, H |
| 112 α | Cu | H, —SO2—C6H4(CONH—C6H3(SO3K)2) | H, H | H, —SO2—C6H4(CONH—C6H3(SO3K)2) | H, H |

TABLE 3-continued
| Exemplary Compound | M | R₁R₄ | R₂R₃ | R₅R₈ | R₆R₇ |
|---|---|---|---|---|---|
| 113 α | Cu | H, 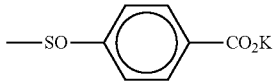 | H, H | H, 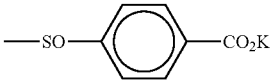 | H, H |
| 114 α | Cu | H, 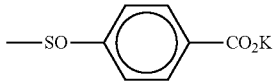 | H, H | H, 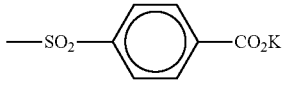 | H, H |
| Exemplary Compound | R₉R₁₂ | R₁₀R₁₁ | R₁₃R₁₆ | R₁₄R₁₅ |
|---|---|---|---|---|
| 111 α | H, 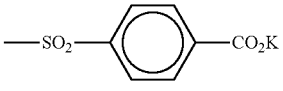 | H, H | H, 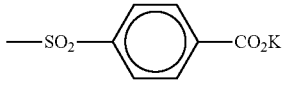 | H, H |
| 112 α | H, 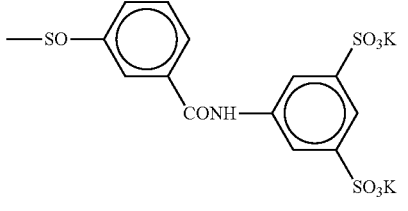 | H, H | H, 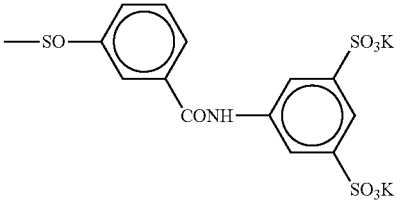 | H, H |
| 113 α | H, 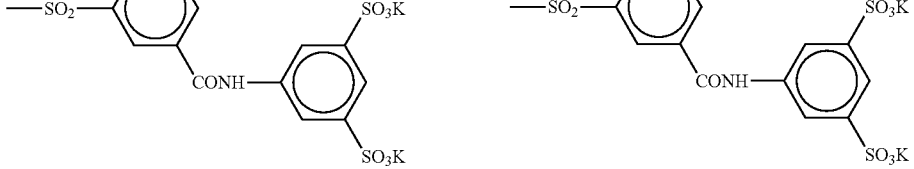 | H, H | H, 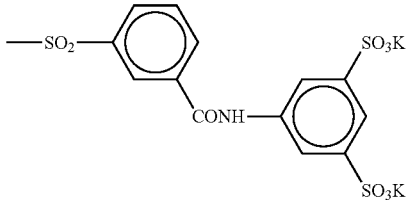 | H, H |
| 114 α | H, 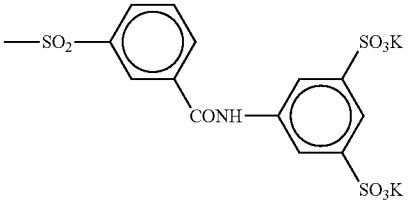 | H, H | H, 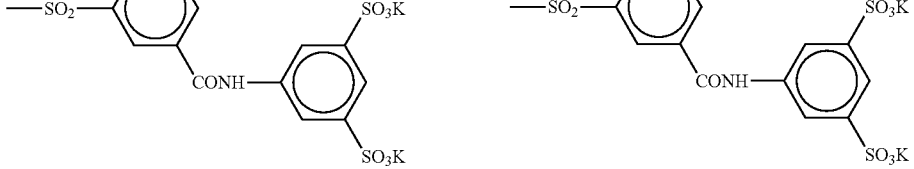 | H, H |
TABLE 4
In the table, specific examples of each set of (R₁R₄) (R₂R₃) (R₅R₈) (R₆R₇) (R₉R₁₂) (R₁₀R₁₁) (R₁₃R₁₆) (R₁₄R₁₅) are each independently listed in a random order.
| Exemplary Compound | M | R₁R₄ | R₂R₃ | R₅R₈ | R₆R₇ |
|---|---|---|---|---|---|
| 115 α | Cu | H, 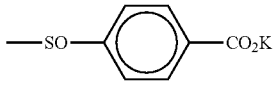 | H, H | H,  | H, H |

TABLE 4-continued

| Exemplary Compound | | R₁R₄ | R₂R₃ | R₅R₈ | R₆R₇ |
|---|---|---|---|---|---|
| 116 α | Cu | H, —SO₂-(2-CO₂Na-phenyl) | H, H | H, —SO₂-(2-CO₂Na-phenyl) | H, H |
| 117 α | Cu | H, —SO-(1-(CH₂)₄SO₃K-imidazol-2-yl) | H, H | H, —SO-(1-(CH₂)₄SO₃K-imidazol-2-yl) | H, H |
| 118 α | Cu | H, —SO₂-(1-(CH₂)₄SO₃K-imidazol-2-yl) | H, H | H, —SO₂-(1-(CH₂)₄SO₃K-imidazol-2-yl) | H, H |

| Exemplary Compound | R₉R₁₂ | R₁₀R₁₁ | R₁₃R₁₆ | R₁₄R₁₅ |
|---|---|---|---|---|
| 115 α | H, —SO-(2-CO₂Na-phenyl) | H, H | H, —SO-(2-CO₂Na-phenyl) | H, H |
| 116 α | H, —SO₂-(2-CO₂Na-phenyl) | H, H | H, —SO₂-(2-CO₂Na-phenyl) | H, H |
| 117 α | H, —SO-(1-(CH₂)₄SO₃K-imidazol-2-yl) | H, H | H, —SO-(1-(CH₂)₄SO₃K-imidazol-2-yl) | H, H |
| 118 α | H, —SO₂-(1-(CH₂)₄SO₃K-imidazol-2-yl) | H, H | H, —SO₂-(1-(CH₂)₄SO₃K-imidazol-2-yl) | H, H |

TABLE 5-X

In the table, specific examples of each set of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are each independently listed in a random order.

| Exemplary Compound | M | $R_1R_4$ | $R_2R_3$ | $R_5R_8$ | $R_6R_7$ |
|---|---|---|---|---|---|
| 119 α | Cu | H, —SO—(2-benzimidazolyl, N-(CH$_2$)$_3$SO$_3$Na) | H, H | H, | H, H |
| 120 α | Cu | H, —SO$_2$—(2-benzimidazolyl, N-(CH$_2$)$_3$SO$_3$Na) | H, H | H, | H, H |
| 121 α | Cu | H, —SO—(1,2,4-triazol-3-yl, N4-(CH$_2$)$_3$SO$_3$K) | H, H | H, | H, H |
| 122 α | Cu | H, —SO$_2$—(1,2,4-triazol-3-yl, N4-(CH$_2$)$_3$SO$_3$K) | H, H | H, | H, H |

| Exemplary Compound | $R_9R_{12}$ | $R_{10}R_{11}$ | $R_{13}R_{16}$ | $R_{14}R_{15}$ |
|---|---|---|---|---|
| 119 α | H, —SO—(2-benzimidazolyl, N-(CH$_2$)$_3$SO$_3$Na) | H, H | H, —SO—(2-benzimidazolyl, N-(CH$_2$)$_3$SO$_3$Na) | H, H |
| 120 α | H, —SO$_2$—(2-benzimidazolyl, N-(CH$_2$)$_3$SO$_3$Na) | H, H | H, —SO$_2$—(2-benzimidazolyl, N-(CH$_2$)$_3$SO$_3$Na) | H, H |
| 121 α | H, —SO—(1,2,4-triazol-3-yl, N4-(CH$_2$)$_3$SO$_3$K) | H, H | H, —SO—(1,2,4-triazol-3-yl, N4-(CH$_2$)$_3$SO$_3$K) | H, H |

TABLE 5-continued
| | | | | | |
|---|---|---|---|---|---|
| 122 α | H, 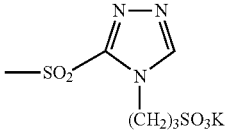 | H, H | H, | 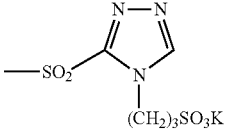 | H, H |
TABLE 6
In the table, specific examples of each set of (R₁R₄) (R₂R₃) (R₅R₈) (R₆R₇) (R₉R₁₂) (R₁₀R₁₁) (R₁₃R₁₆) (R₁₄R₁₅) are each independently listed in a random order.
| Exemplary Compound | M | R₁R₄ | R₂R₃ | R₅R₈ | R₆R₇ |
|---|---|---|---|---|---|
| 123 α | Cu | H,  | H, H | H, | 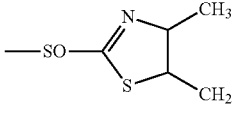 H, H |
| 124 α | Cu | H, 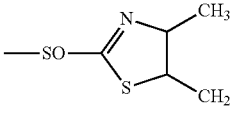 | H, H | H, | 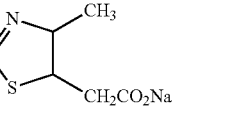 H, H |
| 125 α | Cu | H, 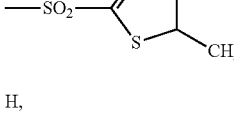 | H, H | H, | 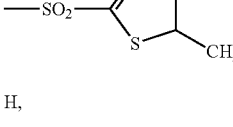 H, H |
| 126 α | Cu | H, 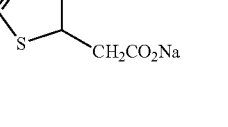 | H, H | H, | 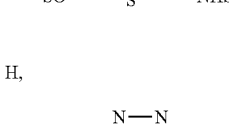 H, H |
| Exemplary Compound | R₉R₁₂ | R₁₀R₁₁ | R₁₃R₁₆ | R₁₄R₁₅ |
|---|---|---|---|---|
| 123 α | H, 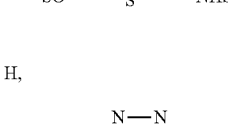 | H, H | H, | 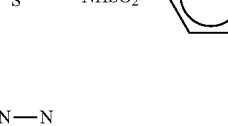 H, H |
| 124 α | H, 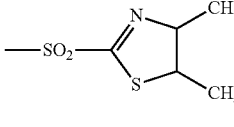 | H, H | H, | 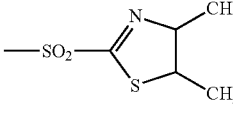 H, H |
| 125 α | H, 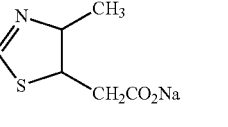 | H, H | H, | 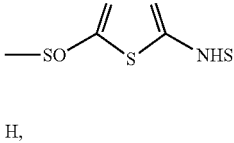 H, H |

TABLE 6X-continued
| 126 α | H, 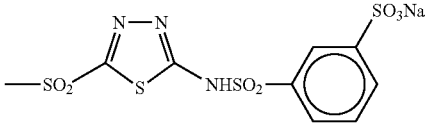 | H, H | H, 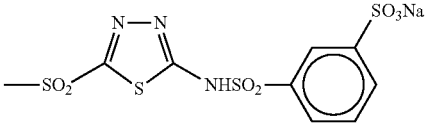 | H, H |
TABLE 7X
In the table, specific examples of each set of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are each independently listed in a random order.
| Exemplary Compound | M | $R_1R_4$ | $R_2R_3$ | $R_5R_8$ | $R_6R_7$ |
|---|---|---|---|---|---|
| 127 α | Cu | H, 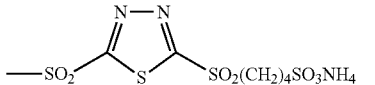 | H, H | H, 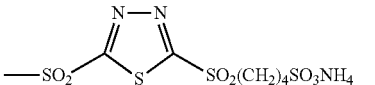 | H, H |
| 128 α | Cu | H, 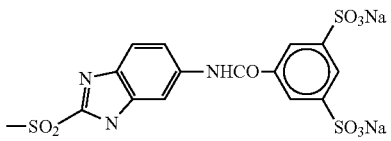 | H, H | H, 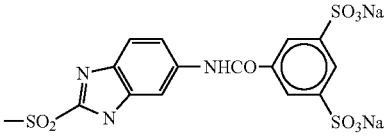 | H, H |
| 129 α | Cu | H, 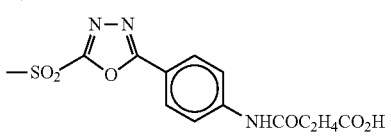 | H, H | H, 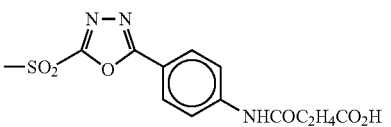 | H, H |
| 130 α | Cu | H, 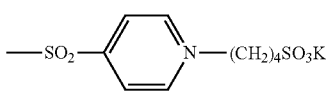 | H, H | H, 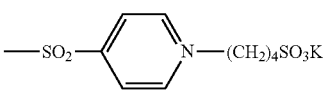 | H, H |
| Exemplary Compound | $R_9R_{12}$ | $R_{10}R_{11}$ | $R_{13}R_{16}$ | $R_{14}R_{15}$ |
|---|---|---|---|---|
| 127 α | H, 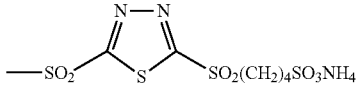 | H, H | H, 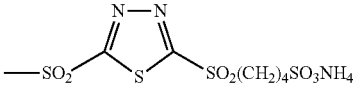 | H, H |
| 128 α | H, 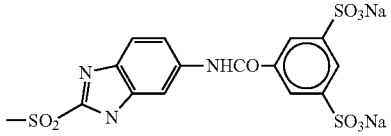 | H, H | H, 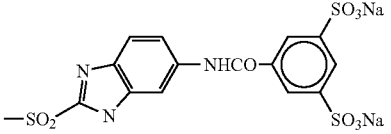 | H, H |
| 129 α | H, 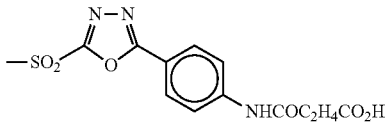 | H, H | H, 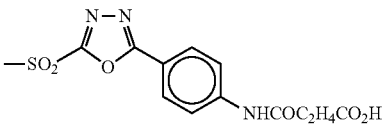 | H, H |

TABLE 7-continued

| 130 α | H, 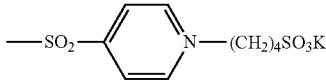 | H, H | H, 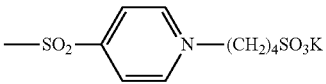 | H, H |

TABLE 8

In the table, specific examples of each set of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are each independently listed in a random order.

| Exemplary Compound | M | $R_1R_4$ | $R_2R_3$ | $R_5R_8$ | $R_6R_7$ |
|---|---|---|---|---|---|
| 134 α | Ni | —SO$_2$—(CH$_2$)$_3$SO$_3$Na, —SO$_2$—(CH$_2$)$_3$SO$_3$Na | H, H | —SO$_2$—(CH$_2$)$_3$SO$_3$Na, —SO$_2$—(CH$_2$)$_3$SO$_3$Na | H, H |
| 135 α | Zn | H, —SO$_2$—(CH$_2$)$_3$SO$_3$Na | H, H | H, —SO$_2$—(CH$_2$)$_3$SO$_3$Na | H, H |
| 136 α | Zn | H, 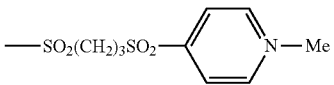 | H, H | H, —SO$_2$—(CH$_2$)$_3$SO$_3$Na | H, H |
| 137 α | Cu | H, 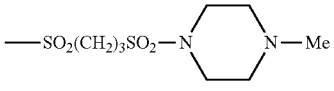 | H, H | H, —SO$_2$—(CH$_2$)$_3$SO$_3$Na | H, H |

| Exemplary Compound | $R_9R_{12}$ | $R_{10}R_{11}$ | $R_{13}R_{16}$ | $R_{14}R_{15}$ |
|---|---|---|---|---|
| 134 α | —SO$_2$—(CH$_2$)$_3$SO$_3$Na, —SO$_2$—(CH$_2$)$_3$SO$_3$Na | H, H | —SO$_2$—(CH$_2$)$_3$SO$_3$Na, —SO$_2$—(CH$_2$)$_3$SO$_3$Na | H, H |
| 135 α | H, —SO$_2$—(CH$_2$)$_3$SO$_3$Na | H, H | H, —SO$_2$—(CH$_2$)$_3$SO$_3$Na | H, H |
| 136 α | H, —SO$_2$—(CH$_2$)$_3$SO$_3$Na | H, H | H, —SO$_2$—(CH$_2$)$_3$SO$_3$Na | H, H |
| 137 α | H, —SO$_2$—(CH$_2$)$_3$SO$_3$Na | H, H | H, —SO$_2$—(CH$_2$)$_3$SO$_3$Na | H, H |

(Examples of Phthalocyanine Dye Represented by Formula (2))

TABLE 9

In the table, specific examples of each set of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are each independently listed in a random order.

| Exemplary Compound | M | $R_1R_4$ | $R_2R_3$ | $R_5R_8$ | $R_6R_7$ |
|---|---|---|---|---|---|
| 101 β | Cu | H, H | H, —SO—(CH$_2$)$_3$SO$_3$Na | H, H | H, —SO—(CH$_2$)$_3$SO$_3$Na |
| 102 β | Cu | H, H | H, —SO$_2$—(CH$_2$)$_3$SO$_3$Na | H, H | H, —SO$_2$—(CH$_2$)$_3$SO$_3$Na |
| 103 β | Cu | H, H | H, 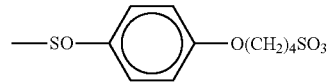 | H, H | H, 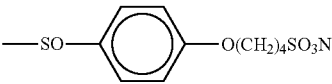 |
| 104 β | Cu | H, H | H,  | H, H | H, 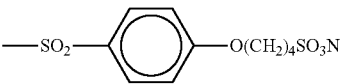 |

TABLE 9-continued

| | | | | | | | |
|---|---|---|---|---|---|---|---|
| 105 β | Cu | H, H | —SO—(CH$_2$)$_3$SO$_3$Na, —SO—(CH$_2$)$_3$SO$_3$Na | | H, H | —SO—(CH$_2$)$_3$SO$_3$Na, —SO—(CH$_2$)$_3$SO$_3$Na | |
| 106 β | Cu | H, H | —SO$_2$—(CH$_2$)$_3$SO$_3$Na, —SO$_2$—(CH$_2$)$_3$SO$_3$Na | | H, H | —SO$_2$—(CH$_2$)$_3$SO$_3$Na, —SO$_2$—(CH$_2$)$_3$SO$_3$Na | |

| Exemplary Compound | R$_9$R$_{12}$ | R$_{10}$R$_{11}$ | R$_{13}$R$_{16}$ | R$_{14}$R$_{15}$ |
|---|---|---|---|---|
| 101 β | H, H | H, —SO—(CH$_2$)$_3$SO$_3$Na | H, H | H, —SO—(CH$_2$)$_3$SO$_3$Na |
| 102 β | H, H | H, —SO$_2$—(CH$_2$)$_3$SO$_3$Na | H, H | H, —SO$_2$—(CH$_2$)$_3$SO$_3$Na |
| 103 β | H, H | H, 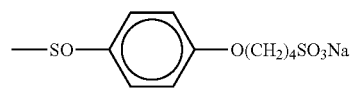 | H, H | H, 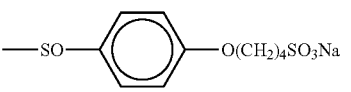 |
| 104 β | H, H | H, 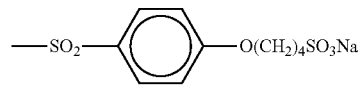 | H, H | H, 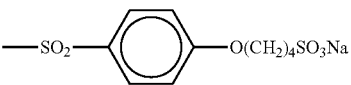 |
| 105 β | H, H | —SO—(CH$_2$)$_3$SO$_3$Na, —SO—(CH$_2$)$_3$SO$_3$Na | H, H | —SO—(CH$_2$)$_3$SO$_3$Na, —SO—(CH$_2$)$_3$SO$_3$Na |
| 106 β | H, H | —SO$_2$—(CH$_2$)$_3$SO$_3$Na, —SO$_2$—(CH$_2$)$_3$SO$_3$Na | H, H | —SO$_2$—(CH$_2$)$_3$SO$_3$Na, —SO$_2$—(CH$_2$)$_3$SO$_3$Na |

TABLE 10

In the table, specific examples of each set of (R$_1$R$_4$) (R$_2$R$_3$) (R$_5$R$_8$) (R$_6$R$_7$) (R$_9$R$_{12}$) (R$_{10}$R$_{11}$) (R$_{13}$R$_{16}$) (R$_{14}$R$_{15}$) are each independently listed in a random order.

| Exemplary Compound | M | R$_1$R$_4$ | R$_2$R$_3$ | R$_5$R$_8$ | R$_6$R$_7$ |
|---|---|---|---|---|---|
| 107 β | Cu | H, H | H, 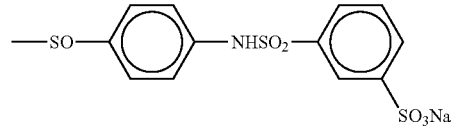 | H, H | H, 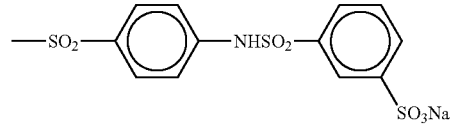 |
| 108 β | Cu | H, H | H, 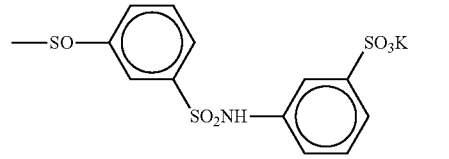 | H, H | H, 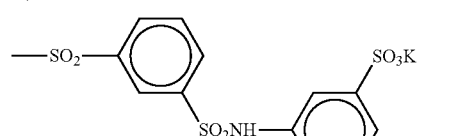 |
| 109 β | Cu | H, H | H, (—SO—phenyl-SO$_2$NH-phenyl-SO$_3$K) | H, H | H, (—SO—phenyl-SO$_2$NH-phenyl-SO$_3$K) |
| 110 β | Cu | H, H | H, (—SO$_2$—phenyl-SO$_2$NH-phenyl-SO$_3$K) | H, H | H, (—SO$_2$—phenyl-SO$_2$NH-phenyl-SO$_3$K) |

TABLE 10-continued

| Exemplary Compound | $R_9R_{12}$ | $R_{10}R_{11}$ | | $R_{13}R_{16}$ | $R_{14}R_{15}$ | |
|---|---|---|---|---|---|---|
| 107 β | H, H | H, | —SO—〔C₆H₄〕—NHSO₂—〔C₆H₃〕—SO₃Na | H, H | H, | —SO—〔C₆H₄〕—NHSO₂—〔C₆H₃〕—SO₃Na |
| 108 β | H, H | H, | —SO₂—〔C₆H₄〕—NHSO₂—〔C₆H₃〕—SO₃Na | H, H | H, | —SO₂—〔C₆H₄〕—NHSO₂—〔C₆H₃〕—SO₃Na |
| 109 β | H, H | H, | —SO—〔C₆H₃(SO₂NH-C₆H₄-SO₃K)〕 | H, H | H, | —SO—〔C₆H₃(SO₂NH-C₆H₄-SO₃K)〕 |
| 110 β | H, H | H, | —SO₂—〔C₆H₃(SO₂NH-C₆H₄-SO₃K)〕 | H, H | H, | —SO₂—〔C₆H₃(SO₂NH-C₆H₄-SO₃K)〕 |

TABLE 11

In the table, specific examples of each set of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are each independently listed in a random order.

| Exemplary Compound | M | $R_1R_4$ | $R_2R_3$ | | $R_5R_8$ | $R_6R_7$ | |
|---|---|---|---|---|---|---|---|
| 111 β | Cu | H, H | H, | —SO—〔C₆H₃(CONH-C₆H₃(SO₃K)₂)〕—SO₃K | H, H | H, | —SO—〔C₆H₃(CONH-C₆H₃(SO₃K)₂)〕—SO₃K |
| 112 β | Cu | H, H | H, | —SO₂—〔C₆H₃(CONH-C₆H₃(SO₃K)₂)〕—SO₃K | H, H | H, | —SO₂—〔C₆H₃(CONH-C₆H₃(SO₃K)₂)〕—SO₃K |

TABLE 11-continued
| Exemplary Compound | | $R_1R_4$ | $R_2R_3$ | | $R_5R_8$ | $R_6R_7$ | |
|---|---|---|---|---|---|---|---|
| 113 β | Cu | H, H | H,  | | H, H | H,  | |
| 114 β | Cu | H, H | H, 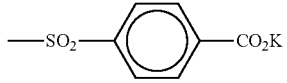 | | H, H | H, 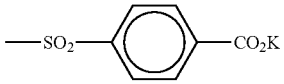 | |
| Exemplary Compound | $R_9R_{12}$ | $R_{10}R_{11}$ | | $R_{13}R_{16}$ | $R_{14}R_{15}$ | |
|---|---|---|---|---|---|---|
| 111 β | H, H | H, 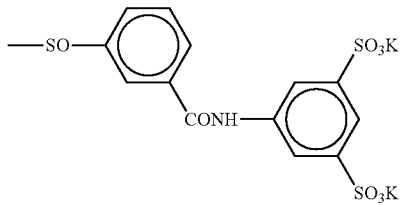 | | H, H | H, 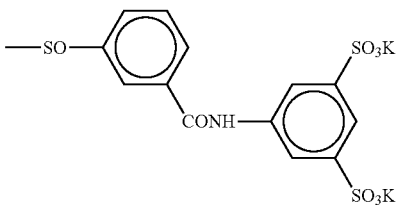 | |
| 112 β | H, H | H, 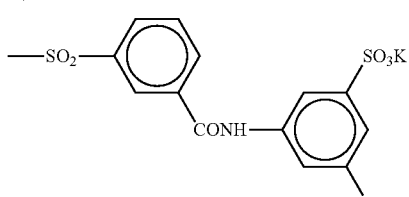 | | H, H | H, 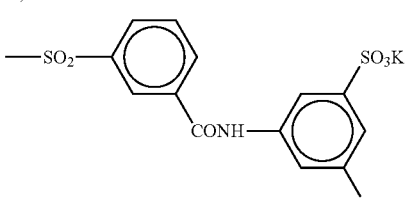 | |
| 113 β | H, H | H, 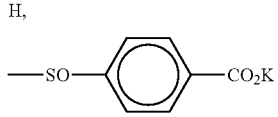 | | H, H | H, 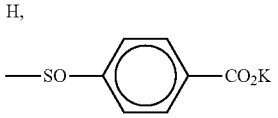 | |
| 114 β | H, H | H, 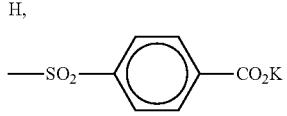 | | H, H | H, 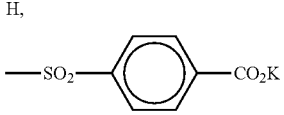 | |
TABLE 12
In the table, specific examples of each set of $(R_1R_4)$ $(R_2R_3)$ $(R_5R_8)$ $(R_6R_7)$ $(R_9R_{12})$ $(R_{10}R_{11})$ $(R_{13}R_{16})$ $(R_{14}R_{15})$ are each independently listed in a random order.
| Exemplary Compound | M | $R_1R_4$ | $R_2R_3$ | | $R_5R_8$ | $R_6R_7$ | |
|---|---|---|---|---|---|---|---|
| 115 β | Cu | H, H | H, 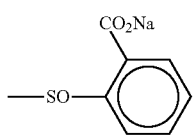 | | H, H | H, 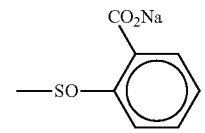 | |

TABLE 12-continued

| Exemplary Compound | | | | | | |
|---|---|---|---|---|---|---|
| 116 β | Cu | H, H | H, —SO$_2$-(2-CO$_2$Na-phenyl) | | H, H | H, —SO$_2$-(2-CO$_2$Na-phenyl) |
| 117 β | Cu | H, H | H, —SO-(1-(CH$_2$)$_4$SO$_3$K-imidazol-2-yl) | | H, H | H, —SO-(1-(CH$_2$)$_4$SO$_3$K-imidazol-2-yl) |
| 118 β | Cu | H, H | H, —SO$_2$-(1-(CH$_2$)$_4$SO$_3$K-imidazol-2-yl) | | H, H | H, —SO$_2$-(1-(CH$_2$)$_4$SO$_3$K-imidazol-2-yl) |

| Exemplary Compound | R$_9$R$_{12}$ | R$_{10}$R$_{11}$ | R$_{13}$R$_{16}$ | R$_{14}$R$_{15}$ |
|---|---|---|---|---|
| 115 β | H, H | H, —SO-(2-CO$_2$Na-phenyl) | H, H | H, —SO-(2-CO$_2$Na-phenyl) |
| 116 β | H, H | H, —SO$_2$-(2-CO$_2$Na-phenyl) | H, H | H, —SO$_2$-(2-CO$_2$Na-phenyl) |
| 117 β | H, H | H, —SO-(1-(CH$_2$)$_4$SO$_3$K-imidazol-2-yl) | H, H | H, —SO-(1-(CH$_2$)$_4$SO$_3$K-imidazol-2-yl) |
| 118 β | H, H | H, —SO$_2$-(1-(CH$_2$)$_4$SO$_3$K-imidazol-2-yl) | H, H | H, —SO$_2$-(1-(CH$_2$)$_4$SO$_3$K-imidazol-2-yl) |

TABLE 13

In the table, specific examples of each set of (R$_1$R$_4$) (R$_2$R$_3$) (R$_5$R$_8$) (R$_6$R$_7$) (R$_9$R$_{12}$) (R$_{10}$R$_{11}$) (R$_{13}$R$_{16}$) (R$_{14}$R$_{15}$) are each independently listed in a random order.

| Exemplary Compound | M | R$_1$R$_4$ | R$_2$R$_3$ | R$_5$R$_8$ | R$_6$R$_7$ |
|---|---|---|---|---|---|
| 119 β | Cu | H, H | H, —SO-(benzimidazole-N-(CH$_2$)$_3$SO$_3$Na) | H, H | H, —SO-(benzimidazole-N-(CH$_2$)$_3$SO$_3$Na) |
| 120 β | Cu | H, H | H, —SO$_2$-(benzimidazole-N-(CH$_2$)$_3$SO$_3$Na) | H, H | H, —SO$_2$-(benzimidazole-N-(CH$_2$)$_3$SO$_3$Na) |
| 121 β | Cu | H, H | H, —SO-(1,2,4-triazole-N-(CH$_2$)$_3$SO$_3$K) | H, H | H, —SO-(1,2,4-triazole-N-(CH$_2$)$_3$SO$_3$K) |
| 122 β | Cu | H, H | H, —SO$_2$-(1,2,4-triazole-N-(CH$_2$)$_3$SO$_3$K) | H, H | H, —SO$_2$-(1,2,4-triazole-N-(CH$_2$)$_3$SO$_3$K) |

| Exemplary Compound | R$_9$R$_{12}$ | R$_{10}$R$_{11}$ | R$_{13}$R$_{16}$ | R$_{14}$R$_{15}$ |
|---|---|---|---|---|
| 119 β | H, H | H, —SO-(benzimidazole-N-(CH$_2$)$_3$SO$_3$Na) | H, H | H, —SO-(benzimidazole-N-(CH$_2$)$_3$SO$_3$Na) |
| 120 β | H, H | H, —SO$_2$-(benzimidazole-N-(CH$_2$)$_3$SO$_3$Na) | H, H | H, —SO$_2$-(benzimidazole-N-(CH$_2$)$_3$SO$_3$Na) |
| 121 β | H, H | H, —SO-(1,2,4-triazole-N-(CH$_2$)$_3$SO$_3$K) | H, H | H, —SO-(1,2,4-triazole-N-(CH$_2$)$_3$SO$_3$K) |

TABLE 13-continued
| | | | R₅R₈ R₆R₇ | | |
|---|---|---|---|---|---|
| 122 β | H, H | H, | 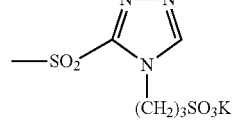 | H, H | 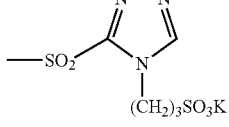 |
TABLE 14
In the table, specific examples of each set of (R₁R₄) (R₂R₃) (R₅R₈) (R₆R₇) (R₉R₁₂) (R₁₀R₁₁) (R₁₃R₁₆) (R₁₄R₁₅) are each independently listed in a random order.
| Exemplary Compound | M | R₁R₄ | R₂R₃ | R₅R₈ | R₆R₇ |
|---|---|---|---|---|---|
| 123 β | Cu | H, H | H, 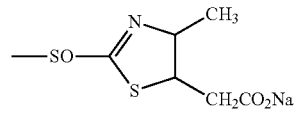 | H, H | 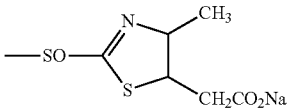 |
| 124 β | Cu | H, H | H, 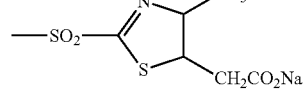 | H, H | 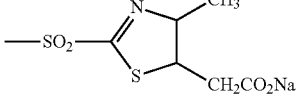 |
| 125 β | Cu | H, H | H, 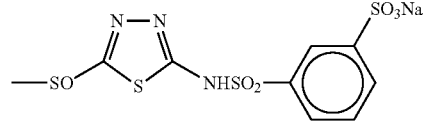 | H, H | 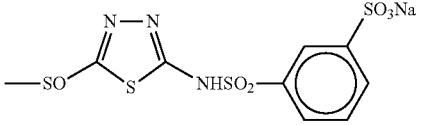 |
| 126 β | Cu | H, H | H, 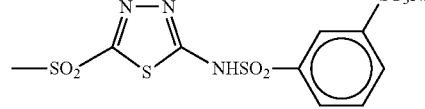 | H, H | 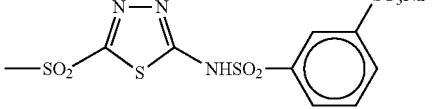 |
| Exemplary Compound | R₉R₁₂ | R₁₀R₁₁ | R₁₃R₁₆ | R₁₄R₁₅ |
|---|---|---|---|---|
| 123 β | H, H | H, 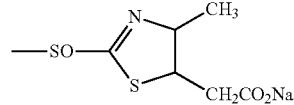 | H, H | 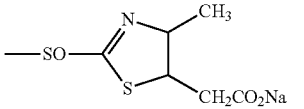 |
| 124 β | H, H | H, 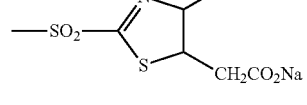 | H, H | 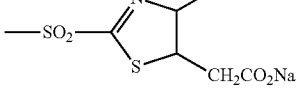 |
| 125 β | H, H | H, 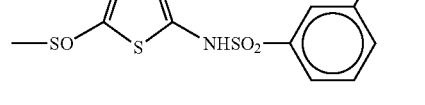 | H, H | 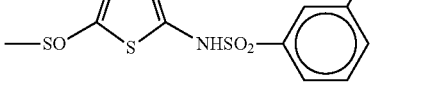 |

TABLE 14-continued
| 126 β | H, H | H, | 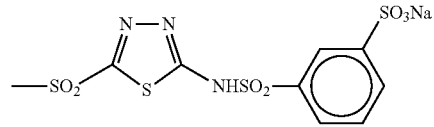 | H, H | H, | 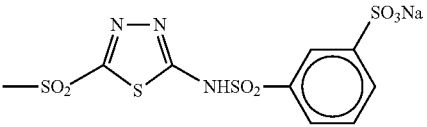 |
TABLE 15
In the table, specific examples of each set of (R₁R₄) (R₂R₃) (R₅R₈) (R₆R₇) (R₉R₁₂) (R₁₀R₁₁) (R₁₃R₁₆) (R₁₄R₁₅) are each independently listed in a random order.
| Exemplary Compound | M | $R_1R_4$ | $R_2R_3$ | | $R_5R_8$ | $R_6R_7$ | |
|---|---|---|---|---|---|---|---|
| 127 β | Cu | H, H | H, | 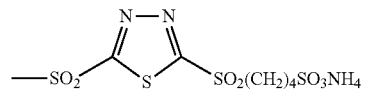 | H, H | H, | 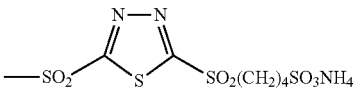 |
| 128 β | Cu | H, H | H, | 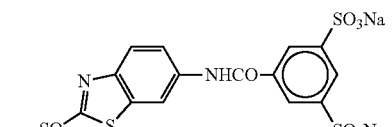 | H, H | H, | 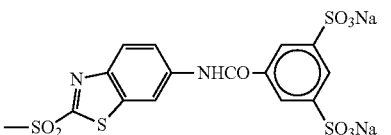 |
| 129 β | Cu | H, H | H, | 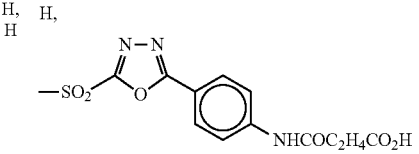 | H, H | H, | 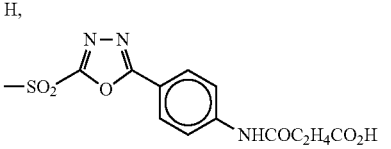 |
| 130 β | Cu | H, H | H, | 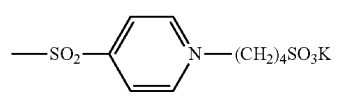 | H, H | H, | 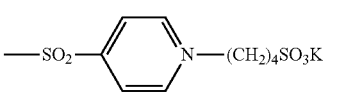 |
| Exemplary Compound | $R_9R_{12}$ | $R_{10}R_{11}$ | | $R_{13}R_{16}$ | $R_{14}R_{15}$ | |
|---|---|---|---|---|---|---|
| 127 β | H, H | H, | 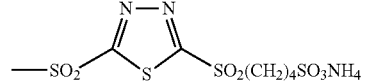 | H, H | H, | 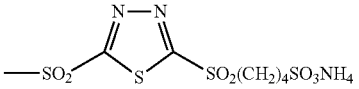 |
| 128 β | H, H | H, | 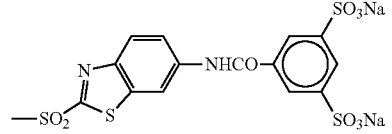 | H, H | H, | 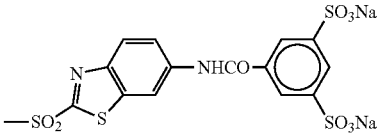 |
| 129 β | H, H | H, | 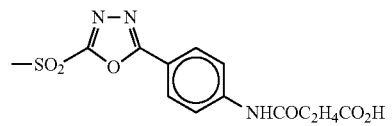 | H, H | H, | 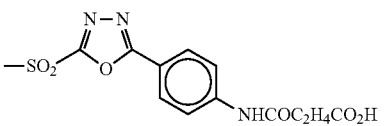 |

TABLE 15X-continued

| 130 β | H, H | H, H | —SO$_2$—⟨pyridinium⟩N—(CH$_2$)$_4$SO$_3$K | H, H | H, H | —SO$_2$—⟨pyridinium⟩N—(CH$_2$)$_4$SO$_3$K |

TABLE 16X

In the table, specific examples of each set of ($R_1R_4$) ($R_2R_3$) ($R_5R_8$) ($R_6R_7$) ($R_9R_{12}$) ($R_{10}R_{11}$) ($R_{13}R_{16}$) ($R_{14}R_{15}$) are each independently listed in a random order.

| Exemplary Compound | M | $R_1R_4$ | $R_2R_3$ | $R_5R_8$ | $R_6R_7$ |
|---|---|---|---|---|---|
| 134 β | Ni | H, H | —SO$_2$—(CH$_2$)$_3$SO$_3$Na, —SO$_2$—(CH$_2$)$_3$SO$_3$Na | H, H | —SO$_2$—(CH$_2$)$_3$SO$_3$Na, —SO$_2$—(CH$_2$)$_3$SO$_3$Na |
| 135 β | Zn | H, H | H, —SO$_2$—(CH$_2$)$_3$SO$_3$Na | H, H | H, —SO$_2$—(CH$_2$)$_3$SO$_3$Na |
| 136 β | Zn | H, H | H, —SO$_2$(CH$_2$)$_3$SO$_2$—⟨pyridinium⟩N—Me | H, H | H, —SO$_2$—(CH$_2$)$_3$SO$_3$Na |
| 137 β | Cu | H, H | H, —SO$_2$(CH$_2$)$_3$SO$_2$NHCH$_2$CH(OH)CH$_3$ | H, H | H, —SO$_2$—(CH$_2$)$_3$SO$_3$Na |
| 138 β | Cu | H, H | H, —SO$_2$(CH$_2$)$_3$SO$_2$NHCH$_2$CH(OH)CH$_3$ | H, H | H, —SO$_2$(CH$_2$)$_3$SO$_2$NHCH$_2$CH(OH)CH$_3$ |
| 139 β | Cu | H, H | H, —SO$_2$(CH$_2$)$_3$SO$_2$—N⟨piperazine⟩N—Me | H, H | H, —SO$_2$—(CH$_2$)$_3$SO$_3$Na |

| Exemplary Compound | $R_9R_{12}$ | $R_{10}R_{11}$ | $R_{13}R_{16}$ | $R_{14}R_{15}$ |
|---|---|---|---|---|
| 134 β | H, H | —SO$_2$—(CH$_2$)$_3$SO$_3$Na, —SO$_2$—(CH$_2$)$_3$SO$_3$Na | H, H | —SO$_2$—(CH$_2$)$_3$SO$_3$Na, —SO$_2$—(CH$_2$)$_3$SO$_3$Na |
| 135 β | H, H | H, —SO$_2$—(CH$_2$)$_3$SO$_3$Na | H, H | H, —SO$_2$—(CH$_2$)$_3$SO$_3$Na |
| 136 β | H, H | H, —SO$_2$—(CH$_2$)$_3$SO$_3$Na | H, H | H, —SO$_2$—(CH$_2$)$_3$SO$_3$Na |
| 137 β | H, H | H, —SO$_2$—(CH$_2$)$_3$SO$_3$Na | H, H | H, —SO$_2$—(CH$_2$)$_3$SO$_3$Na |
| 138 β | H, H | H, —SO$_2$—(CH$_2$)$_3$SO$_3$Na | H, H | H, —SO$_2$—(CH$_2$)$_3$SO$_3$Na |
| 139 β | H, H | H, —SO$_2$—(CH$_2$)$_3$SO$_3$Na | H, H | H, —SO$_2$—(CH$_2$)$_3$SO$_3$Na |

[Preservative]

A preservative will be explained below.

According to the present invention, a preservative refer to a substance that has a function of preventing emergence and growth of microorganisms, in particular, bacteria and mycete (fungi).

Various preservatives may be used in the present invention.

Examples of the preservative include an inorganic preservative (containing silver ions) containing heavy metal ions or a salt. As an organic preservative, a quaternary ammonium salt (tetrabutylammonium chloride, cetylpyridinium chloride, benzyltrimethylammonium chloride, or the like), a phenol derivative (phenol, cresol, butylphenol, xylenol, bisphenol, or the like), a phenoxy ether derivative (phenoxy ethanol or the like), a heterocyclic compound (benzotriazole, PROXEL, 1,2-benzisothiazolin-3-one, or the like), alkanediols (pentylene glycol (1,2-pentanediol)), isopentyldiol (3-methyl-1,3-butanediol), hexanediol (1,2-hexanediol or the like), caprylyl glyol (1,2-octanediol or the like), acid amides, a carbamic acid, carbamates, amidines, guanidines, pyridines (sodium pyridinethione-1-oxide or the like), thiazines, triazines, pyrroles, imidazoles, oxazoles, oxazines, thiazoles, thiathiazines, thioureas, thiosemicarbazides, dithiocarbamates, sulfides, sulfoxides, sulfones, sulfamides, antibiotic substances (penicillin, tetracycline, or the like), sodium dehydroacetate, sodium benzoate, p-hydroxybenzoic acid ethyl ester, salts thereof, and the like may be used. Further, as the preservative, the substances described in Handbook of Antimicrobial & Antifungal Agents (Gihodo, 1986), Dictionary of Antimicrobial & Antifungal Agents (the editing committee of the Japanese Society of Antimicrobial & Antifungal Agents), etc., may also be used.

These compounds may be used as various types such as an oil-soluble structure and a water-soluble structure, but a water-soluble compound is preferred.

The coloring composition of the present invention may contain two or more preservatives. According to the present invention, if two or more preservatives are used, better effects of the present invention are exhibited: the storage stability in ink and recording images, in particular, color stability is enhanced, and furthermore, the discharge stability during long-term storage of ink is significantly enhanced. It is considered that bacteria contact two or more preservatives so that bacteria are prohibited from acquiring tolerance to individual preservatives.

When two or more preservatives are combined, the preservatives preferably have different chemical structures. In addition, when two or more preservatives are contained, at least one preservative is preferably a heterocyclic compound, a phenol derivative, a phenoxy ether derivative, or alkanediol, and the heterocyclic compound is more preferred. Preferred examples of the combination include a combination of a heterocyclic compound and a phenoxy ether derivative, a combination of a heterocyclic compound and a phenol derivative, a combination of a heterocyclic compound and alkanediol, and the like.

In addition, the heterocyclic compound is preferably a thiazole-based compound or a benzotriazole-based compound.

The thiazole-based compound particularly functions as an antifungal agent among the preservatives. Examples of the thiazole-based compound may include benzisothiazoline, isothiazoline, 1,2-benzisothiazoline-3-one, 5-chloro-2-methyl-4-isothiazoline-3-one, 2-(thiocyanomethylthio)benzthiazole, 2-mercaptobenzthiazole, 3-allyloxy-1,2-benzisothiazole-1,1-oxide, and the like. Further, a series of PROXEL (trademark) (BDN, BD20, GXL, LV, XL2, Ultra10, and the like) manufactured and sold by Arch Chemicals, Inc. may be used as thiazole-based antifungal agents.

The benzotriazole-based compound functions, among preservatives, particularly as a corrosion inhibitor, and can prevent rusting which is caused by the contact of metal materials consisting of an inkjet head (in particular, 42 alloy (a nickel-iron alloy containing 42% of nickel)) with ink. Examples of the benzotriazole-based compound include 1H-benzotriazole, 4-methyl-1H-benzotriazole, 5-methyl-HI-benzotriazole, a sodium salt or potassium salt thereof, and the like.

If two or more preservatives are combined, the content ratio of each preservative, although not particularly specified, is preferably 1% by mass or more, more preferably 10% by mass or more, and still more preferably 20% by mass or more based on the total content of preservatives. Further, the content ratio of each preservative is preferably 99% by mass or less, more preferably 90% by mass or less, and still more preferably 80% by mass or less based on the total content of preservatives. By adopting these numerical values, the effect of each preservative can be efficiently obtained and the synergetic effect between preservatives can be easily obtained. In addition, while maintaining the effect of preservatives, the possibility of outbreak of a rash, etc. on a person who contacted ink, in particular a person who is sensitive to preservatives may be decreased.

The added amounts of preservatives in the coloring composition (if two or more preservatives are added, the total content is mentioned) may be used in a broad range, but is preferably 0.001% by mass to 10% by mass, more preferably 0.005% by mass to 2.0% by mass, and still more preferably 0.01% by mass to 0.5% by mass. By adopting these numerical values, the effect of preservatives may be more efficiently obtained and the risk of occurrence of precipitate may be prohibited.

The ink for inkjet recording according to the present invention may be prepared by using the coloring composition as a stock solution and diluting the coloring composition with water, for example, 2 to 5 times. When diluting the coloring composition with water, etc., preservatives may also be added thereto. The added amount of preservatives in the ink for inkjet recording is the same as the added amount in the coloring composition.

In the coloring composition or the ink for inkjet recording according to the present invention, the content ratio of the dye represented by Formula (1) to the preservative (preservative/the dye represented by the Formula (1)) is preferably 0.00001 to 5, more preferably 0.00002 to 0.5, and still more preferably 0.00001 to 0.05.

[Coloring Composition]

The coloring composition of the present invention contains a phthalocyanine dye presented by Formula (1), a phthalocyanine dye represented by Formula (2), and at least one preservative. By containing the first dye having strong associativity and high fastness, and represented by Formula (2) (the phthalocyanine dye represented by Formula (1)), the second dye having weak associativity and high print density, and represented by Formula (1) (the phthalocyanine dye represented by Formula (2)), and further preservatives, it is possible to obtain the coloring composition in which color and ozone gas fastness are excellent, bronze gloss is suppressed, print quality such as print density is high, temporal stability and preserve performance are high at a high concentration, and particularly, discharge stability after long-term storage in an aqueous solution is excellent.

The coloring composition of the present invention can be preferably used as a coloring composition for forming images. The use of the coloring composition of the invention includes an image recording material for forming an image, in particular, a color image, and specifically, including the recording material for inkjet system described in detail below. Heat-sensitive transfer-type image recording material, pressure-sensitive recording material, recording material using an electrophotographic system, transfer-type silver halide light-sensitive material, printing inks, recording pens, and the like are preferred; and recording material for inkjet system, heat-sensitive transfer-type image recording material, and recording material using an electrophotographic system are more preferred; and the recording material for inkjet system is far more preferred. Further, the coloring composition can be applied to a dye solution for dyeing various fibers or color filters used in solid-state image pickup device such as LCD and CCD described in the specifications of U.S. Pat. No. 4,808,501, Japanese Patent Application Laid-Open No. Hei 6-35182, or the like. The phthalocyanine dye used in the present invention may be used by adjusting physical properties such as solubility and thermal mobility suitable for its application by the substituents. In addition, the phthalocyanine dye used in the present invention may be used in the uniformly dissolved state or the dispersed melt state as emulsion dispersion depending on the system used.

Among the coloring composition, the mass ratio of the phthalocyanine dye represented by Formula (1) and the phthalocyanine dye represented by Formula (2) is preferably 50/50 to 10/90, and more preferably 40/60 to 20/80. By setting the mass ratio of the dye within the above range, temporal stability (e.g., change in viscosity or precipitation, etc.) at high concentration of the coloring composition is excellent, and an ozone fastness of the print sample using the corresponding coloring composition is excellent. Furthermore, an excellent print density can be obtained.

In addition, the content of the phthalocyanine dye represented by Formula (1) in the coloring composition is preferably 0.1% by mass to 10% by mass. If the content thereof is 0.1% by mass or more, the temporal stability at high concentration and the print density of the coloring composition are excellent. If the content thereof is 10% by mass or less, the ozone fastness of the printed sample is excellent.

The mass ratio of the total content of the phthalocyanine dyes represented by Formulas (1) and (2) and the preservatives in the coloring composition is preferably 90/10 to 99/1, and more preferably 95/5 to 97.5/2.5.

[Ink for Inkjet Recording]

The ink for inkjet recording of the present invention will be explained below. The ink for inkjet recording of the present invention includes the coloring composition. The content of the dye represented by Formula (1) in the ink for inkjet recording is the same as the content in the coloring ink composition.

The ink for inkjet recording of the present invention may be adjusted by diluting a stock solution of the ink for inkjet recording in water, etc. The added amount of the phthalocyanine dye represented by Formula (1) and the phthalocyanine dye represented by Formula (2) in the stock solution of the ink for inkjet recording may be used in a broad range, but preferably 1% by mass to 20% by mass and more preferably 3% by mass to 15% by mass based on the total amount of the stock solution of the ink for inkjet recording.

A method of preparing the coloring ink composition of the present invention will be explained below.

The coloring ink composition of the present invention may be prepared by dissolving a dye in an aqueous medium (preferably, an aqueous medium), adding a particular amount of surfactant thereto, and adding additives such as an anti-drying agent or a penetration inhibitor, if necessary. The phrase "aqueous medium" means water or a mixture of water and a small amount of a water-miscible organic solvent, to which additives such as a wetting agent, a stabilizer, and a preservative are added.

When preparing the ink solution of the present invention, first dissolving in water for an aqueous ink is preferred. Thereafter, various solvents or additives are added thereto and a uniform ink solution is prepared by dissolving and mixing.

Various dissolving methods such as stirring, irradiation of ultrasonic waves, and succussion may be used. Among the methods, particularly stirring is preferably used. When conducting stirring, it is possible to use various manners such as flow stirring which is known in the pertinent field and stirring by using shearing force using a reverse agitator or a dissolver. In addition, like a magnetic stirrer, a stirring method using shearing force with the bottom surface of a container may be preferably used.

The method of preparing the aqueous ink for inkjet recording is specifically described in Japanese Patent Application Laid-Open No. Hei 5-148436, Japanese Patent Application Laid-Open No. Hei 5-295312, Japanese Patent Application Laid-Open No. Hei 7-97541, Hei 7-82515, Japanese Patent Application Laid-Open No. 7-118584, Japanese Patent Application Laid-Open No. 2002-020657, and Japanese Patent Application Laid-Open No. 2002-060663, and may be used to prepare the ink for inkjet recording of the present invention.

In the ink for inkjet recording of the present invention, examples of additives which may be added as necessary may include known additives such as an anti-drying agent (wetting agent), an anti-fading agent, an emulsion stabilizer, a penetration enhancer, a UV absorber, a preservative, a pH adjusting agent, a surface tension modifier, a defoamer, a viscosity modifier, a dispersant, a dispersion stabilizer, a rust inhibitor, and a chelating agent. These various additives are added directly to the ink solution in an aqueous ink. When using an oil-soluble dye in the form of a dispersion, it is general to add to the dispersion after preparation of the dye dispersion, but the additives may be added to an oil phase or an aqueous phase upon preparation.

An anti-drying agent is suitably used for the purpose of preventing clogging, which is caused by an inkjet ink dried in an ink injection port of a nozzle used in an inkjet recording system.

The anti-drying agent is preferably a water-soluble organic solvent having a lower vapor pressure than that of water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, and trimethylolpropane; lower alkyl ethers of polyhydric alcohols such as ethylene glycol monomethyl (or ethyl) ether, diethylene glycol monomethyl (or ethyl) ether, and triethylene glycol monoethyl (or butyl) ether; heterocyclic groups such as 2-pyrrolidone, N-methyl-2-pyrrolidone, 1,3-dimethyl-2-imidazolidinone, and N-ethylmorpholine; sulfur-containing compounds such as sulfolane, dimethylsulfoxide, and 3-sulforen; polyfunctional compounds such as diacetone alcohol and diethanol amine; and urea derivatives. Among them, polyhydric alcohols such as glycerin and diethylene glycol are more preferred. Further, the above anti-drying agent may be used either alone or in combination of two or more thereof. The anti-drying agent may be preferably contained in 10% by mass to 50% by mass of the ink.

A penetration enhancer may be suitably used for the purpose of better penetrating inkjet ink into the paper. As the penetration enhancer, alcohols such as ethanol, isopropanol, butanol, di(tri)ethyleneglycol monobutyl ether, and 1,2-hexanediol; or nonionic surfactants such as sodium lauryl sulfate, and sodium oleate may be used. If the enhancer is contained in 5% by mass to 30% by mass of the ink, the effect is usually sufficient, and the enhancers may be preferably used in the range that does not cause print smearing or paper omission (print-through).

A UV absorber may be used for the purpose of improving storage stability of an image. As the UV absorber, benzotriazole-based compounds described in Japanese Patent Application Laid-Open No. Sho 58-185677, Japanese Patent Application Laid-Open No. Sho 61-190537, Japanese Patent Application Laid-Open No. Hei 2-782, Japanese Patent Application Laid-Open No. Hei 5-197075, Japanese Patent Application Laid-Open No. Hei 9-34057, and the like; benzophenone-based compounds described in the specifications of Japanese Patent Application Laid-Open No. Sho 46-2784, Japanese Patent Application Laid-Open No. Hei 5-194483, U.S. Pat. No. 3,214,463, and the like; cinnamic acid compounds described in Japanese Patent Application Laid-Open No. Sho 48-30492, Japanese Patent Application Laid-Open. No. Sho 56-21141, Japanese Patent Application Laid-Open No. Hei 10-88106, and the like; triazine-based compounds described in Japanese Patent Application Laid-Open No. Hei 4-298503, Japanese Patent Application Laid-Open No. Hei 8-53427, Japanese Patent Application Laid-Open No. Hei 8-239368, Japanese Patent Application Laid-Open No. Hei 10-182621, Japanese Patent Application Laid-Open No. Hei 8-501291, and the like; the compounds described in Research Disclosure No. 24239; or a compound which emits fluorescence by absorbing ultraviolet radiation such as stilbene compounds and benzoxazole-based compounds, a so-called fluorescent brightener, may be used.

An anti-fading agent may be used for the purpose of improving storage stability of an image. As the anti-fading agent, various organic and metal complex anti-fading agents may be used. Examples of the organic anti-fading agent include hydroquinones, alkoxy phenols, dialkoxy phenols, phenols, anilines, amines, indans, chromans, alkoxy anilines, heterocyclic groups, and the like; and examples of the metal complex anti-fading agents include nickel complex, zinc complex, and the like. More specifically, the compounds described in the patents cited in sections I to J of Chapter VII of Research Disclosure No. 17643, Research Disclosure No. 15162, the left column on page 650 of Research Disclosure No. 18716, page 527 of Research Disclosure No. 36544, page 872 of Research Disclosure No. 307105, and Research Disclosure No. 15162, or the compounds included in the examples and formulas of representative compounds described on pages 127-137 of Japanese Patent Application. Laid-Open No. Sho 62-215272, may be used.

Examples of the antifungal agent include sodium dehydroacetate, sodium benzoate, sodium pyridinethione-1-oxide, p-hydroxybenzoic acid ethyl ester, 1,2-benzisothiazolin-3-one, salts thereof, and the like. The agent may be preferably used from 0.02% by mass to 1.00% by mass in the ink.

As the pH adjusting agent, the above-mentioned neutralizer (organic base, inorganic alkali) may be used. The pH adjusting agent may be preferably added for the purpose of improving the storage stability of the ink for inkjet recording, so that the corresponding ink for inkjet recording is preferably pH 6 to pH 10, and more preferably pH 7 to 10.

Examples of the surface tension modifier include nonionic, cationic or anionic surfactants. The surface tension of the inkjet ink of the present invention is preferably 25 mN/m to 70 mN/m. The range of 25 mN/m to 60 mN/m is also preferred. Further, viscosity of the ink for inkjet recording of the present invention is preferably less than 30 mPa·s. Being adjusted to less than 20 mPa·s or is more preferred. Preferred examples of surfactants may include anionic surfactants such as fatty acid salts, alkyl sulfate ester salts, alkyl benzene sulfonate salts, alkyl naphthalene sulfonate salts, dialkyl sulfosuccinate salts, alkyl phosphate ester salts, naphthalene sulfonic acid formalin condensates, and polyoxyethylene alkyl sulfate ester salts; or nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerin fatty acid esters, and oxyethylene oxypropylene block copolymers. Also, an acetylenic polyoxyethylene oxide surfactant, i.e., SURFYNOLS (Air Products & Chemicals Inc.), is preferably used. In addition, amine oxide type amphoteric surfactants such as N,N-dimethyl-N-alkylamine oxide are preferred. Moreover, the surfactants described as examples on pages 37 to 38 of Japanese Patent Application Laid-Open No. Sho 59-157636 and Research Disclosure No. 308119 (in the year of 1989) may be used.

As the defoaming agent, a fluorine-based compound, a silicon-based compound, or a chelating agent represented by EDTA, or the like may be used, if necessary.

When the phthalocyanine compound of the invention are dispersed in an aqueous medium, coloring fine particles containing the colorant and oil-soluble polymer can preferably be dispersed in the aqueous medium, as described in each of Japanese Patent Application Laid-Open No. Hei 11-286637, Japanese Patent Application No. 2000-78491, Japanese Patent Application No. 2000-80259, Japanese Patent Application No. 2000-62370, and the like, or the compound of the invention dissolved in an organic solvent having a high boiling point may be preferably dispersed in the aqueous medium, as described in each of the specifications of Japanese Patent Application No. 2000-78454, Japanese Patent Application No. 2000-78491, Japanese Patent Application No. 2000-203856, Japanese Patent Application No. 2000-203857, and the like. A specific method of dispersing the compound of the present invention in an aqueous medium, an oil-soluble polymer used, a high-boiling organic solvent, additives and the used amounts thereof can be preferably used as described in the above-mentioned patent publications. Alternatively, the phthalocyanine compound may be dispersed in the state of solid fine particles. At the time of dispersion, it is possible to use a dispersant or a surfactant. As a dispersion device, a simple stirrer, an impeller stirring system, an in-line stirring system, a mill system (e.g., colloid mill, ball mill, sand mill, attritor mill, roll mill, agitator mill, etc.), an ultrasonic method, a high-pressure emulsification dispersion method (high-pressure homogenizer; Gaulin homogenizer as a specific commercial device, micro fluidizer, DeBEE2000, etc.) may be used. The aforesaid preparation methods of the ink for inkjet recording are, in addition to the aforementioned patents, specifically described in Japanese Patent Application Laid-Open No. Hei 5-148436, Japanese Patent Application Laid-Open No. Hei 5-295312. Japanese Patent Application Laid-Open No. Hei 7-97541, Japanese Patent Application Laid-Open No. Hei 7-82515, Japanese Patent Application Laid-Open No. Hei 7-118584, Japanese Patent Application Laid-Open No. Hei 11-286637, and Japanese Patent Application No. 2000-87539, and can also be used in the preparation of the ink for ink jet recording of the present invention.

The aqueous medium may use water as a main component and use mixtures obtained by adding a water-miscible organic solvent, as needed. Examples of the water-miscible organic solvent include an alcohol (e.g., methanol, ethanol, propanol, isopropanol, butanol, isobutanol, sec-butanol, t-butanol, pentanol, hexanol, cyclohexanol, benzyl alcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monomethyl ether, triethylene glycol monoethyl ether, ethylene glycol monophenyl ether), and amines (e.g., ethanolamine, diethanolamine, triethanolamine, N-methyldiethanolamine, N-ethyl diethanolamine, morpholine, N-ethyl morpholine, ethylene diamine, diethylene triamine, triethylene tetramine, polyethylene imine, tetramethyl propylene diamine) and other polar solvents (e.g., formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile, acetone). Further, the water-miscible organic solvent may be used in combination with two or more thereof.

In 100 parts by mass of the ink for inkjet recording of the present invention, the phthalocyanine compound may be preferably contained in less than 0.2 parts by mass to 20 parts by mass, more preferably 1 part by mass to 10 parts by mass, far more preferably 3 parts by mass to 5 parts by mass, and most preferably 4 parts by mass to 5 parts by mass. Further, the inkjet ink of the present invention may be used in combination with the other dyes together with the phthalocyanine compound. When two or more types of colorants are used in combination, the sum of the contents of the colorants is preferably within the above-described range.

The ink for inkjet recording of the present invention preferably has a viscosity of 40 cp or less. Further, the surface tension is preferably 20 mN/m to 70 mN/m. Viscosity and surface tension can be adjusted by adding various additives, for example, a viscosity modifier, a surface tension adjusting agent, a specific resistance modifier, a film adjusting agent, an ultraviolet absorber, an antioxidant, an anti-fading agent, an antifungal agent, a rust preventive, a dispersant, and a surfactant.

The ink for inkjet recording of the present invention can be used not only to form a monochromatic image, but also to form a full color image. In order to form a full color image, a magenta color tone ink, a cyan color tone ink, and a yellow color tone ink can be used, and in order to match color tone, a black color tone ink may also be used.

As an applicable yellow dye, it is possible to use any dye. For example, a coupling component (hereinafter, referred to as a "coupler component") includes aryl or heteryl azo dyes having heterocyclic groups, such as phenols, naphthols, anilines, pyrazolone, or pyridone, and open-chain active methylene compounds; for example, azomethine dyes having open-chain active methylene compounds as a coupler component; for example, methine dyes such as benzylidene dyes or monomethine oxonol dyes; for example, quinone dyes such as naphthoquinone dyes or anthraquinone dyes; and other dyes such as quinophthalone dyes, nitro, nitroso dyes, acridine dyes, and acridinone dyes.

As an applicable magenta dye, it is possible to use any dye. For example, coupler components include aryl or heteryl azo dyes having phenols, naphthols, anilines, and the like; for example, azomethine dyes having pyrazolones, pyrazolo triazoles, and the like as a coupler component; for example, methine dyes such as arylidene dyes, styryl dyes, merocyanine dyes, cyanine dyes, and oxonol dyes; for example, carbonium dyes such as diphenylmethane dyes, triphenylmethane dyes, and xanthene dyes; for example, quinone dyes such as naphthoquinone, anthraquinone, and anthrapyridone; and for example, condensed polycyclic dyes such as dioxazine dyes.

As an applicable cyan dye, it is possible to use any dye. For example, coupler components include aryl or heteryl azo dyes having phenols, naphthols, anilines, and the like; for example, azomethine dyes having heterocyclic groups such as phenols, naphthols, and pyrrolo triazole as a coupler component; polymethine dyes such as cyanine dyes, oxonol dyes, and melocyanine dyes; carbonium dyes such as diphenylmethane dyes, triphenylmethane dyes, and xanthene dyes; phthalocyanine dyes; anthraquinone dyes; indigo, thioindigo dyes; and the like.

In each of the above-mentioned dyes, a part of the chromophore may be dissociated to exhibit respective colors of yellow, magenta, and cyan. In this case, the counter cation may be an inorganic cation such as an alkali metal or an ammonium, or an organic cation such as pyridinium and a quaternary ammonium salt, and furthermore, a polymer cation having these cations as a partial structure. Examples of the applicable black material include the dispersant of carbon black as well as disazo, trisazo, and tetraazo dyes.

[Inkjet Recording Method]

The inkjet recording method of the present invention donates energy to the ink for inkjet recording to form a color image on a known image receiving material, namely, plain paper, resin coated paper, inkjet paper described in, for example, Japanese Patent Application Laid-Open No. Hei 8-169172, Japanese Patent Application Laid-Open No. Hei 8-27693, Japanese Patent Application Laid-Open No. Hei 2-276670, Japanese Patent Application Laid-Open No. Hei 7-276789, Japanese Patent Application Laid-Open No. Hei 9-323475, Japanese Patent Application Laid-Open No. Sho 62-238783, Japanese Patent Application Laid-Open No. Hei 10-153989, Japanese Patent Application Laid-Open No. Hei 10-217473, Japanese Patent Application Laid-Open No. Hei 10-235995, Japanese Patent Application Laid-Open No. Hei 10-337947, Japanese Patent Application Laid-Open No. Hei 10-217597, and Japanese Patent Application Laid-Open No. Hei 10-337947, film, electrophotographic common paper, cloth, glass, metal, ceramics, or the like.

When forming an image, it is also possible to use in combination with a polymer fine particle dispersion (also referred to as polymer latex) in order to give glossiness and water resistance or improve weather resistance. The point in time of imparting the polymer latex on the image receiving material may be good before or after the colorant is added, or even simultaneously with the addition of the colorant. Thus, the polymer latex may be added to a receiving paper, an ink, or a liquid of the polymer latex alone. Specifically, the methods described in each of the specifications of Japanese Patent Application No. 2000-363090, Japanese Patent Application No. 2000-315231, Japanese Patent Application No. 2000-354380, Japanese Patent Application No. 2000-343944, Japanese Patent Application No. 2000-268952, Japanese Patent Application No. 2000-299465, Japanese Patent Application No. 2000-297365, and the like can be preferably used.

[Ink Cartridge for Inkjet Recording and Inkjet Recording Materials]

The ink cartridge for inkjet recording of the present invention is refilled with the aforesaid ink for inkjet recording of the invention. Further, the inkjet recording materials of the present invention form color images on the recorded materials by using the ink for inkjet recording.

The recording paper and recording film used in the inkjet printing by using the ink of the present invention will be described below. The support in the recording paper or the recording film comprises chemical pulp such as LBKP and NBKP, mechanical pulp such as GP, PGW, RMP, TMP, CTMP, CMP, and CGP, and waste paper pulp such as DIP, and if necessary, can be used by mixing additives such as conventional, known pigments, binders, sizing agents, fixing agents, cationic agents, or paper strengthening agents, and by using the paper manufactured by various devices such as fourdrinier paper machine or cylinder paper machine. In addition to these supports, any of a synthetic paper or a sheet of plastic film is preferred, and the thickness of the support is preferably 10 μm to 250 μm, and the basis weight is preferably 10 $g/m^2$ to 250 $g/m^2$. On the support, an ink receiving layer and a back coating layer may be provided as they are, or the ink receiving layer and the back coating layer may be provided after forming a size press or an anchor coating layer by using starch, polyvinyl alcohol, or the like. In addition, the support may be flattening treated by a calendering apparatus such as a machine calender, a TG calender, or a soft calender. In the present invention, the paper and plastic films laminated on both sides with polyolefin (e.g., polyethylene, polystyrene, polyethylene terephthalate, polybutene, and copolymers thereof) are more preferred as the support. A white pigment (e.g., titanium oxide or zinc oxide) or a coloring dye (e.g., cobalt blue, ultramarine, neodium oxide) is preferably added into the polyolefin.

The ink receiving layer provided on the support contains a pigment and an aqueous binder. As the pigment, a white pigment is preferred, and as the white pigment, white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, and organic pigments such as styrene pigments, acrylic pigments, urea resins, and melamine resins are preferred. As the white pigment contained in the ink receiving layer, porous inorganic pigments are preferred, and particularly the synthetic amorphous silica having a large pore area is preferred. As a synthetic amorphous silica, any of anhydrous silicic acid obtained by a dry production process and hydrous silicate obtained by a wet production method can be used, but particularly, hydrous silicate may be preferably used.

The aqueous binder contained in the ink receiving layer includes water-soluble polymers such as polyvinyl alcohol, silanol-modified polyvinyl alcohol, starch, cationized starch, casein, gelatin, carboxymethyl cellulose, hydroxyethyl cellulose, polyvinyl pyrrolidone, polyalkylalkylene oxide, and polyalkylene oxide derivatives, and water-dispersible polymers such as styrene butadiene latex and acrylic emulsion. These aqueous binders may be used alone or in combination with two or more thereof. In the present invention, among the aqueous binders, polyvinyl alcohol and silanol-modified polyvinyl alcohol are particularly preferred in terms of adhesion to the pigment and peeling resistance of the ink receiving layer. The ink receiving layer may contain mordants, water-proofing agents, light resistance improving agents, surfactants, and other additives, in addition to the pigment and aqueous binder.

The mordant added to the ink receiving layer is preferably immobilized. To do this, a polymer-mordant is preferably used. Examples of the polymer-mordant are described in each of the specifications of Japanese Patent Application Laid-Open No. Sho 48-28325, Japanese Patent Application Laid-Open No. Sho 54-74430, Japanese Patent Application Laid-Open No. Sho 54-124726, Japanese Patent Application Laid-Open No. Sho 55-22766, Japanese Patent Application Laid-Open No. Sho 55-142339, Japanese Patent Application Laid-Open No. Sho 60-23850, Japanese Patent Application Laid-Open No. Sho 60-23851, Japanese Patent Application Laid-Open No. Sho 60-23852, Japanese Patent Application Laid-Open No. Sho 60-23853, Japanese Patent Application Laid-Open No. Sho 60-57836, Japanese Patent Application Laid-Open No. Sho 60-60643, Japanese Patent Application Laid-Open No. Sho 60-118834, Japanese Patent Application Laid-Open No. Sho 60-122940, Japanese Patent Application Laid-Open No. Sho 60-122941, Japanese Patent Application Laid-Open No. Sho 60-122942, Japanese Patent Application Laid-Open No. Sho 60-235134, Japanese Patent Application Laid-Open No. Hei 1-161236, U.S. Pat. No. 2,484,430, U.S. Pat. No. 2,548,564, U.S. Pat. No. 3,148,061, U.S. Pat. No. 3,309,690, U.S. Pat. No. 4,115,124, U.S. Pat. No. 4,124,386, U.S. Pat. No. 4,193,800, U.S. Pat. No. 4,273,853, U.S. Pat. No. 4,282,305, and U.S. Pat. No. 4,450,224. An image-receiving material containing the polymer-mordant described on pages 212 to 215 of Japanese Patent Application Laid-Open No. Hei 1-161236 is particularly preferred. When the polymer-mordant described in the same publication is used, the image having excellent image quality is obtained, and the light resistance of the image is improved.

The water-proofing agent is effective for waterproofing of an image, and as the water-proofing agent, a cationic resin is preferred. Examples of the cationic resin include polyamide polyamine epichlorohydrin, polyethyleneimine, polyamine sulfone, dimethyl diallyl ammonium chloride polymer, cationic polyacrylamide, colloidal silica and the like, and polyamide polyamine epichlorohydrin is particularly preferred among them. The content of such cationic resin preferably ranges from 1% by mass to 15% by mass, and more preferably, from 3% by mass to 10% by mass based on the total solid content of the ink receiving layer.

The light resistance improving agent includes a benzotriazole-based ultraviolet absorber such as zinc sulfate, zinc oxide, hindered amine-based antioxidants, and benzophenone. Zinc sulfate is particularly preferred among them.

The surfactant functions as a coating aid, a peeling property improving agent, a sliding improving agent or an antistatic agent. The surfactant is described in Japanese Patent Application Laid-Open No. Sho 62-173463 and Japanese Patent Application Laid-Open No. Sho 62-183457. Instead of the surfactant, an organic fluoro compound may be used. The organic fluoro compound is preferably hydrophobic. Examples of the organic fluoro compound include fluorine-based surfactants, oily fluorine-based compounds (e.g., fluorine oil), and solid fluorine compound resins (e.g., tetrafluoroethylene resin). The organic fluoro compound is described in Japanese Patent Application Laid-Open No. Sho 57-9053 (columns 8 to 17), Japanese Patent Application Laid-Open No. Sho 61-20994, and Japanese Patent Application Laid-Open No. 62-135826. Other additives added to the ink receiving layer include pigment dispersants, thickeners, defoamers, dyes, fluorescent brighteners, preservatives, pH adjusting agents, matting agents, hardening agents, and the like. Also, the ink receiving layer may be used as either one or two layer.

On the recording paper and recording film, a back coating layer may be provided, and the components which can be added to this layer include a white pigment, an aqueous binder, and other components. Examples of the white pigment contained in the back coating layer include white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo-boehmite, aluminum hydroxide, alumina, lithopone, zeolite, hydrolyzed halloysite, magnesium carbonate, and magnesium hydroxide, and organic pigments such as styrene-based plastic pigments, acrylic plastic pigments, polyethylene, microcapsules, urea resin, and melamine resin.

The aqueous binders contained in the back coating layer include water-soluble polymers such as a styrene/maleate copolymer, styrene/acrylate copolymer, polyvinyl alcohol, silanol-modified polyvinyl alcohol, starch, cationic starch, casein, gelatin, carboxymethyl cellulose, hydroxyethylcellulose, and polyvinyl pyrrolidone; water-dispersible polymers such as styrene-butadiene latex and acrylic emulsion; and the like. Other components contained in the back coating layer include defoamers, foam inhibitors, dyes, fluorescent brighteners, preservatives, waterproofing agents, and the like.

A polymer latex may be added to the structure layer (including a back coating layer) of the inkjet recording paper and the recording film. The polymer latex is used for the purpose of improvement of film properties such as dimensional stability, curling prevention, adhesion prevention, and film cracking prevention. The polymer latex is described in Japanese Patent Application Laid-Open No. Sho 62-245258, Japanese Patent Application Laid-Open No. Sho 62-1316648, and Japanese Patent Application Laid-Open No. Sho 62-110066. When a polymer latex having a low glass transition temperature (40° C. or below) is added to a layer containing a mordant, craking and curling of the layer can be prevented. Further, when a polymer latex having a high glass transition temperature is added to the back coating layer, curling can be prevented.

The ink of the present invention is not limited on the inkjet recording method and may be used in a known manner, for example, a charge control system discharging the ink by utilizing electrostatic attraction, a drop-on-demand system (pressure pulse manner) utilizing vibration pressure of a piezo element, an acoustic inkjet system changing electrical signals to acoustic beams to irradiate the beams onto the ink and discharging the ink by using the radiation pressure, a thermal inkjet system heating the ink to form bubbles and using the generated pressure, and the like. The inkjet recording method includes a method of injecting a number of ink droplets of low concentration, a so-called photo ink in a small volume, a method of improving the image quality by using a plurality of inks having different densities, but substantially the same color, or a method using colorless transparent ink.

EXAMPLES

The present invention will be described below more in detail by way of examples, but the invention is not limited thereto.

[Preparation of Ink Stock Solution]

10 g of Compound (A) and 90 g of Compound (B) were dissolved in 900 g of deionized water at room temperature with stirring, and then, 1 g (that is, 0.1 g as a solid content (active ingredient)) of PROXEL XL2 (manufactured by Fujifilm Imaging Colorants, Inc., 10% by mass of an active ingredient) (preservative) was added thereto, and they were thoroughly mixed and dissolved. Consequently, insoluble matters were filtered by using a membrane filter having an average pore diameter of 0.2 μm to obtain Ink Stock Solution A.

Ink stock solutions B and C were prepared in the same manner as in the preparation of the Ink stock solution A, except that the PROXEL XL2 (a thiazole-based heterocyclic compound; manufactured by Fujifilm Imaging Colorants, Inc.) (preservative) was changed as set forth in the following Table 17. Further, the term "phenoxyethanol" in the preservative column of Table 17 means 0.1 g of phenoxyethanol added, and the term "pentylene glycol" means 0.1 g of pentylene glycol added.

Ink stock solutions D to O and Ink stock solutions 102 and 105 for comparison were prepared in the same manner as in the preparation of the Ink stock solution A, except that 10 g of Compound (1A) and 90 g of Compound (2B) were changed as set forth in Table 17 below.

At that time, as comparative ink stock solutions, Ink stock solutions 101, 103 and 104 were prepared in the same manner as in the preparation of the Ink stock solution A, except that no preservative was contained.

TABLE 17

| Ink Stock Solution | Dye Compound | | Preservative |
|---|---|---|---|
| | Compound 1 | Compound 2 | |
| A | 1A(10 g) | 2B(90 g) | PROXEL XL2 |
| B | 1A(10 g) | 2B(90 g) | Phenoxyethanol |

TABLE 17-continued

| Ink Stock Solution | Dye Compound | | Preservative |
|---|---|---|---|
| | Compound 1 | Compound 2 | |
| C | 1A(10 g) | 2B(90 g) | Pentylene Glycol |
| D | 1A(15 g) | 2B(85 g) | PROXEL XL2 |
| E | 1A(20 g) | 2B(80 g) | PROXEL XL2 |
| F | 1A(25 g) | 2B(75 g) | PROXEL XL2 |
| G | 1A(40 g) | 2B(60 g) | PROXEL XL2 |
| H | 1A(50 g) | 2B(50 g) | PROXEL XL2 |
| I | 1A(10 g) | 2C(90 g) | PROXEL XL2 |
| J | 1A(20 g) | 2C(80 g) | PROXEL XL2 |
| K | 1A(25 g) | 2C(75 g) | PROXEL XL2 |
| L | 1A(30 g) | 2C(70 g) | PROXEL XL2 |
| M | 1A(40 g) | 2C(60 g) | PROXEL XL2 |
| N | 1A(50 g) | 2C(50 g) | PROXEL XL2 |
| O | 1B(80 g) | 2D(20 g) | PROXEL XL2 |
| 101 | 1A(10 g) | 2B(90 g) | — |
| 102 | — | 2B(100 g) | PROXEL XL2 |
| 103 | 1A | — | — |
| 104 | — | 2C(100 g) | — |
| 105 | — | 2D(100 g) | PROXEL XL2 |

Example 1

Preparation of Ink Liquid 1

Ink stock solution A obtained as described above was used and deionized water was added to the components set forth in Table 18 below to be 1000 g, and the solution was stirred for one hour while heated at 30° C. to 40° C. The solution was filtered under reduced pressure through a microfilter having an average pore size of 0.25 μM to prepare Ink Liquid 1 (a cyan ink).

[Composition of Ink Liquid 1]

TABLE 18

| | Ink liquid 1 |
|---|---|
| Ink stock solution | Ink Stock Solution A 500 g |
| Glycerin | 90 g |
| Ethylene glycol | 100 g |
| 2-pyrrolidone | 70 g |
| Ethylene urea | 100 g |
| Surfinol 465 (acetylene glycol-based surfactant) (manufactured by Nissin Chemical Industry Co., Ltd.) | 10 g |
| Preservative | PROXEL XL2 3.4 g |

Examples 2 to 24, Comparative Examples 101 to 105

Preparation of Ink Liquids 2 to 24 and 101 to 105

Ink Liquids 2 to 24 and 101 to 105 (cyan ink) were each prepared in the same manner as in the preparation of Ink Liquid 1, except that the types of preservatives newly added when preparing ink stock solutions and ink liquids, and the added amounts thereof were changed as set forth in Table 19 below.

[Composition of Ink Liquids 2 to 24 and 101 to 105]

TABLE 19

| | Ink Liquid | Ink Stock Solution | Preservative |
|---|---|---|---|
| Ex. 2 | Ink Liquid 2 | Ink Stock Solution B 500 g | Phenoxyethanol 0.34 g |
| Ex. 3 | Ink Liquid 3 | Ink Stock Solution C 500 g | Pentylene glycol 0.34 g |
| Ex. 4 | Ink Liquid 4 | Ink Stock Solution B 500 g | PROXEL XL2 3.4 g |

TABLE 19-continued

| | Ink Liquid | Ink Stock Solution | Preservative |
|---|---|---|---|
| Ex. 5 | Ink Liquid 5 | Ink Stock Solution C 500 g | PROXEL XL2 3.4 g |
| Ex. 6 | Ink Liquid 6 | Ink Stock Solution D 500 g | PROXEL XL2 3.4 g |
| Ex. 7 | Ink Liquid 7 | Ink Stock Solution E 500 g | PROXEL XL2 3.4 g |
| Ex. 8 | Ink Liquid 8 | Ink Stock Solution F 500 g | PROXEL XL2 3.4 g |
| Ex. 9 | Ink Liquid 9 | Ink Stock Solution G 500 g | PROXEL XL2 3.4 g |
| Ex. 10 | Ink Liquid 10 | Ink Stock Solution H 500 g | PROXEL XL2 3.4 g |
| Ex. 11 | Ink Liquid 11 | Ink Stock Solution I 500 g | PROXEL XL2 3.4 g |
| Ex. 12 | Ink Liquid 12 | Ink Stock Solution J 500 g | PROXEL XL2 3.4 g |
| Ex. 13 | Ink Liquid 13 | Ink Stock Solution K 500 g | PROXEL XL2 3.4 g |
| Ex. 14 | Ink Liquid 14 | Ink Stock Solution L 500 g | PROXEL XL2 3.4 g |
| Ex. 15 | Ink Liquid 15 | Ink Stock Solution M 500 g | PROXEL XL2 3.4 g |
| Ex. 16 | Ink Liquid 16 | Ink Stock Solution N 500 g | PROXEL XL2 3.4 g |
| Ex. 17 | Ink Liquid 17 | Ink Stock Solution A 500 g | PROXEL XL2/Phenoxyethanol = 1.7 g/0.17 g |
| Ex. 18 | Ink Liquid 18 | Ink Stock Solution A 500 g | PROXEL XL2/Pentylene glycol = 1.7 g/0.17 g |
| Ex. 19 | Ink Liquid 19 | Ink Stock Solution A 500 g | PROXEL XL2/Phenoxyethanol = 1.7 g/0.34 g |
| Ex. 20 | Ink Liquid 20 | Ink Stock Solution A 500 g | PROXEL XL2/Pentylene glycol = 1.7 g/0.34 g |
| Ex. 21 | Ink Liquid 21 | Ink Stock Solution A 500 g | PROXEL XL2 1.9 g |
| Ex. 22 | Ink Liquid 22 | Ink Stock Solution A 500 g | PROXEL XL2 19 g |
| Ex. 23 | Ink Liquid 23 | Ink Stock Solution A 500 g | PROXEL XL2 34.2 g |
| Ex. 24 | Ink Liquid 24 | Ink Stock Solution O 500 g | PROXEL XL2 3.4 g |
| C. Ex. 101 | Ink Liquid 101 | Ink Stock Solution 101 500 g | — |
| C. Ex. 102 | Ink Liquid 102 | Ink Stock Solution 102 500 g | PROXEL XL2 3.4 g |
| C. Ex. 103 | Ink Liquid 103 | Ink Stock Solution 103 500 g | — |
| C. Ex. 104 | Ink Liquid 104 | Ink Stock Solution 104 500 g | — |
| C. Ex. 105 | Ink Liquid 105 | Ink Stock Solution 105 500 g | PROXEL XL2 3.4 g |

[Image Recording and Evaluation]

For the ink liquids of each Example (Examples 1 to 24) and each Comparative Example (Comparative Examples 101 to 105) described above, evaluation was carried out as follows. The results are illustrated in Table 20. In addition, image recording was conducted onto photo glossy paper (PT-101, Canon) and plain paper (GF500, Canon) by an inkjet printer (manufactured by EPSON (Ltd.) Co.; PM-700C).

(Ozone Resistance)

The photo gloss paper forming image was left for 7 days in a box set in a dark place where the concentration of ozone is 0.5±0.1 ppm at room temperature, and the image density before and after standing under the ozone gas was measured by using a reflection densitometer (X-Rite310TR) and evaluated as the colorant residual ratio. Further, the reflection density was measured at three points of 1, 1.5 and 2.0. The ozone gas concentration in the box was set up with an ozone gas monitor (Model: OZG-EM-01) manufactured by APPLICS. The colorant residual ratio was evaluated at four stages: as AA when the colorant residual ratio at any concentration is 80% or more, as A when the colorant residual ratio at any concentration is more than 70% but less than 80%, as B when point 1 or 2 is less than 70%, and as C when the ratio at all concentrations is less than 70%.

(Print Density)

The reflection density at 100% of print density in plain paper was measured by using a reflection densitometer (X-Rite310TR), and evaluated at three stages: as A when the reflection density 1.10 or more, as B when the reflection density is more than 1.00 but less than 1.10, and as C when the reflection density is less than 1.00.

(Bronze Gloss)

The highest concentration portion of the printed sample was observed visually under a white fluorescent lamp, and evaluated at three stages: as A when the bronze gloss is not observed, as B when the gloss is observed faintly, and as C when the gloss is observed clearly.

(Color)

The printed sample was observed visually, and evaluated at three stages: as A when the color is a pure cyan, as B when the color is a cyan close to slightly reddish blue, and as C when the color is certainly blue.

(Preservative Property)

A cap of a food stamp (for viable cell count and mycete) for inspecting bacteria, which was manufactured by Nissui Pharmaceutical Co., Ltd., was adopted and a sufficient amount of inkjet ink was applied onto the surface of an agar medium. The ink was uncapped and left for ten hours to promote attachment of bacteria. Then the ink was capped. With respect to the food stamp for viable cell count, the ink was cultured for two days in a water bath at 36° C., and with respect to the food stamp for mycete, the ink was cultured for five days in a water bath at 23° C. The ink was observed visually and evaluated based on the following standards:

A . . . No fungal growth observed

B . . . Fungal growth observed (Discharge Stability)

Each ink obtained as described above was refilled in an ink cartridge for an inkjet recording device (product name: PIXUS iP8600: manufactured by CANON), the ink cartridge was set into the inkjet recording device, the ink discharge from all nozzles was confirmed, and 20 pages in A4 size were printed to evaluate discharge stability based on the following standards:

AA: No mess was found in elements from the start of printing to the end thereof

A: Almost no mess was found in elements from the start of printing to the end thereof B: Prints with messy elements were found C: Continuous mess was found in elements from the start of printing to the end thereof This experiment was conducted after the ink cartridge was preserved for two weeks under the condition of 40° C., 80%, and RH.

TABLE 20

|  | Ink Liquid | Ozone Resistance | Print Density | Bronze Gloss | Color | Preservative Performance | Discharge Stability |
|---|---|---|---|---|---|---|---|
| Ex. 1 | Ink Liquid 1 | AA | B | A | A | A | A |
| Ex. 2 | Ink Liquid 2 | AA | B | A | A | A | A |
| Ex. 3 | Ink Liquid 3 | AA | B | A | A | A | AA |
| Ex. 4 | Ink Liquid 4 | AA | B | A | A | A | AA |
| Ex. 5 | Ink Liquid 5 | AA | B | A | A | A | AA |
| Ex. 6 | Ink Liquid 6 | AA | A | A | A | A | AA |
| Ex. 7 | Ink Liquid 7 | A | A | A | A | A | AA |
| Ex. 8 | Ink Liquid 8 | A | A | A | A | A | AA |
| Ex. 9 | Ink Liquid 9 | A | A | A | A | A | AA |
| Ex. 10 | Ink Liquid 10 | A | A | A | A | A | AA |
| Ex. 11 | Ink Liquid 11 | AA | B | A | A | A | AA |
| Ex. 12 | Ink Liquid 12 | AA | B | A | A | A | AA |
| Ex. 13 | Ink Liquid 13 | A | A | A | A | A | AA |
| Ex. 14 | Ink Liquid 14 | A | A | A | A | A | AA |
| Ex. 15 | Ink Liquid 15 | A | A | A | A | A | AA |
| Ex. 16 | Ink Liquid 16 | A | A | A | A | A | AA |
| Ex. 17 | Ink Liquid 17 | A | B | A | A | A | AA |
| Ex. 18 | Ink Liquid 18 | A | B | A | A | A | AA |
| Ex. 19 | Ink Liquid 19 | A | B | A | A | A | AA |
| Ex. 20 | Ink Liquid 20 | A | B | A | A | A | AA |
| Ex. 21 | Ink Liquid 21 | A | B | A | A | A | A |
| Ex. 22 | Ink Liquid 22 | A | B | A | A | A | AA |
| Ex. 23 | Ink Liquid 23 | A | B | A | A | A | AA |
| Ex. 24 | Ink Liquid 24 | B | B | A | A | A | AA |
| C. Ex. 101 | Ink Liquid 101 | A | B | A | A | B | C |
| C. Ex. 102 | Ink Liquid 102 | AA | C | A | A | A | B |
| C. Ex. 103 | Ink Liquid 103 | C | A | A | B | B | C |
| C. Ex. 104 | Ink Liquid 104 | AA | C | C | A | B | C |
| C. Ex. 105 | Ink Liquid 105 | AA | C | B | C | A | B |

Example 101

Deionized water was added to the following components to be 33.3 g, and the solution was stirred for one hour while heated at 50° C. The solution was adjusted to pH=9 by 10 mol/L of NaOH to prepare a concentrated aqueous solution.

| Phthalocyanine Dye (Compound 1A) | 0.5 g |
|---|---|
| Phthalocyanine Dye (Compound 2B) | 4.5 g |
| PROXEL XL2 | 0.12 g |

Examples 102 to 114, Comparative Examples 111 to 119

The concentrated aqueous solutions of Examples 102 to 114 and Comparative Examples 111 to 119 were prepared in the same manner as in the preparation of the rich aqueous solution of Example 101, except for changing the phthalocyanine dye and the added amount thereof, and preservatives and the added amounts thereof as set forth in the following Tables 21 and 22.

(Temporal Storage Stability)

The concentrated aqueous solutions of each Example (Examples 101 to 114) and each Comparative Example (Comparative Examples 111 to 119) as described above were stored for two weeks at a sealed or fixed state, and evaluated at two stages by visual confirmation: as A when the solutions maintain a dissolved state, and as B when precipitation or separation of a dye occurs. The results are set forth in Tables 21 and 22.

TABLE 21

|  | Dye of Formula (1) | | Dye of Formula (2) | | Preservative | | Temporal storage stability | Remarks |
|---|---|---|---|---|---|---|---|---|
| Ex. 101 | 1A | 0.5 g | 2B | 4.5 g | PROXEL XL 2 | 0.12 g | A | Inventive |
| Ex. 102 | 1A | 0.5 g | 2B | 4.5 g | Phenoxyethanol | 0.012 g | A | Inventive |
| Ex. 103 | 1A | 0.5 g | 2B | 4.5 g | Pentylene glycol | 0.012 g | A | Inventive |
| Ex. 104 | 1A | 1 g | 2B | 4 g | PROXEL XL 2 | 0.12 g | A | Inventive |
| Ex. 105 | 1A | 1.25 g | 2B | 3.25 g | PROXEL XL 2 | 0.12 g | A | Inventive |
| Ex. 106 | 1A | 2 g | 2B | 3 g | PROXEL XL 2 | 0.12 g | A | Inventive |
| Ex. 107 | 1A | 2.5 g | 2B | 2.5 g | PROXEL XL 2 | 0.12 g | A | Inventive |
| Ex. 108 | 1A | 0.5 g | 2C | 4.5 g | PROXEL XL 2 | 0.12 g | A | Inventive |
| Ex. 109 | 1A | 0.5 g | 2C | 4.5 g | Phenoxyethanol | 0.012 g | A | Inventive |
| Ex. 110 | 1A | 0.5 g | 2C | 4.5 g | Pentylene glycol | 0.012 g | A | Inventive |
| Ex. 111 | 1A | 1 g | 2C | 4 g | PROXEL XL 2 | 0.12 g | A | Inventive |
| Ex. 112 | 1A | 1.25 g | 2C | 3.25 g | PROXEL XL 2 | 0.12 g | A | Inventive |
| Ex. 113 | 1A | 2 g | 2C | 3 g | PROXEL XL 2 | 0.12 g | A | Inventive |
| Ex. 114 | 1A | 2.5 g | 2C | 2.5 g | PROXEL XL 2 | 0.12 g | A | Inventive |

TABLE 22

| | Dye of Formula (1) | | Dye of Formula (2) | | Preservative | | Temporal storage stability | Remarks |
|---|---|---|---|---|---|---|---|---|
| C. Ex. 111 | 1A | 5 g | — | — | — | — | B | Comparative |
| C. Ex. 112 | 1B | 5 g | — | — | — | — | B | Comparative |
| C. Ex. 113 | — | — | 2A | 5 g | — | — | B | Comparative |
| C. Ex. 114 | — | — | 2B | 5 g | — | — | B | Comparative |
| C. Ex. 115 | — | — | 2C | 5 g | — | — | B | Comparative |
| C. Ex. 116 | — | — | 2D | 5 g | — | — | B | Comparative |
| C. Ex. 117 | 1B | 5 g | — | — | PROXEL XL 2 | 0.02 g | B | Comparative |
| C. Ex. 118 | — | — | 2D | 5 g | PROXEL XL 2 | 0.02 g | B | Comparative |
| C. Ex. 119 | Comparative Compound 3 5 g | | | | | | B | Comparative |

It was found that the ink for inkjet recording of the present invention has good color and ozone gas fastness, suppressed bronze gloss, high print density such as in print concentration, temporal stability at high concentration, excellent preservative property, and in particular, good stability in ink discharge after long-term storage in an aqueous solution. Further, the temporal storage stability of the ink liquid was found superior.

The structure of the compound used in the Examples and the Comparative Examples will be illustrated below.

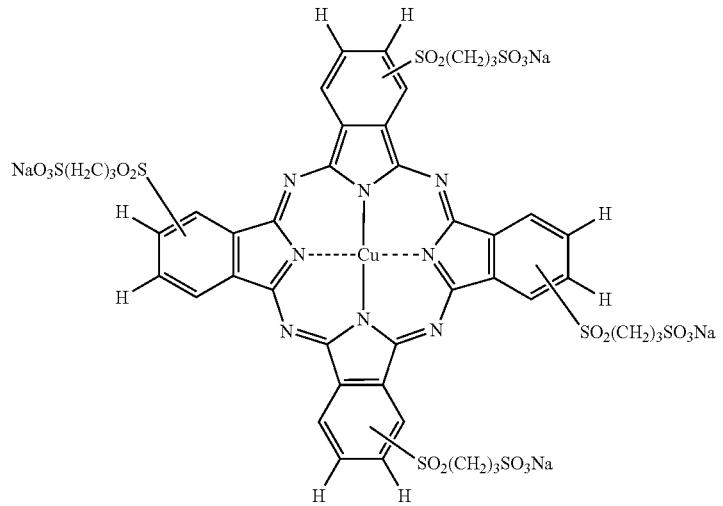

(IA)

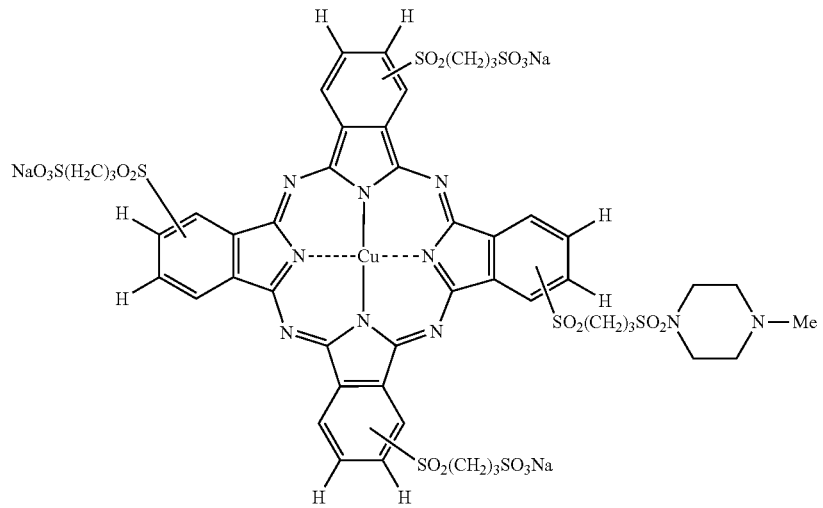

(IB)

-continued
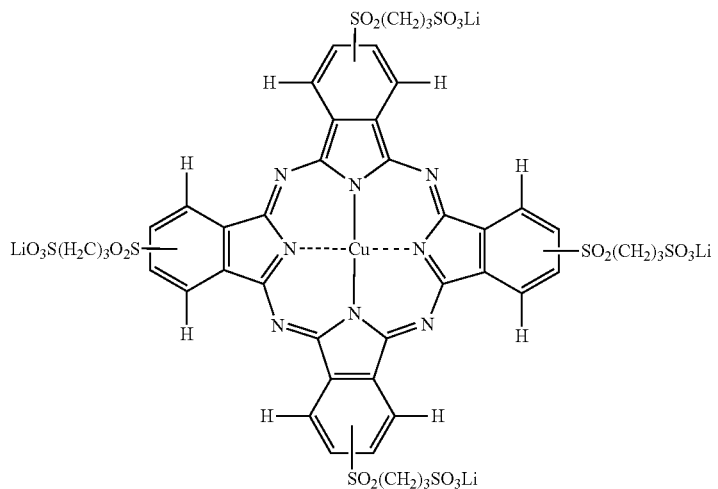
(2A)
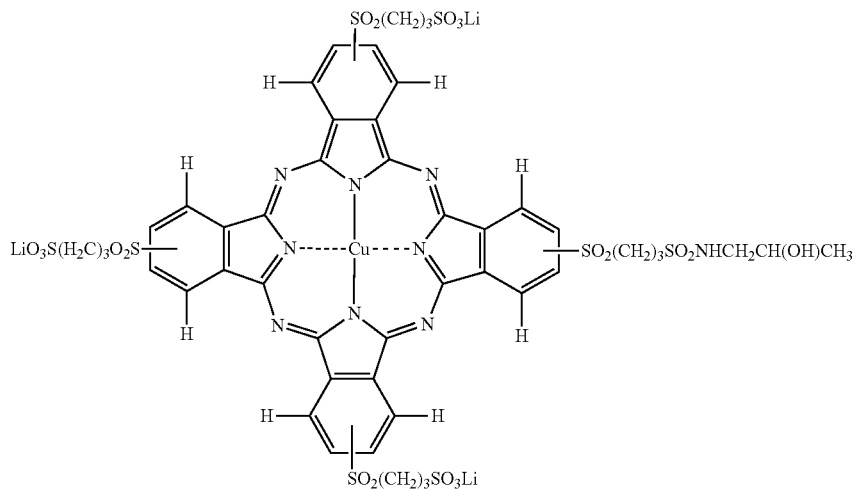
(2B)
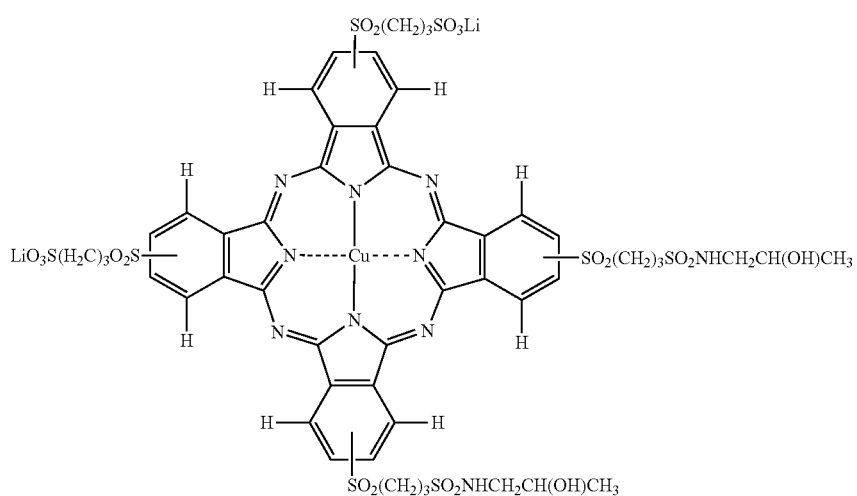
(2C)

-continued

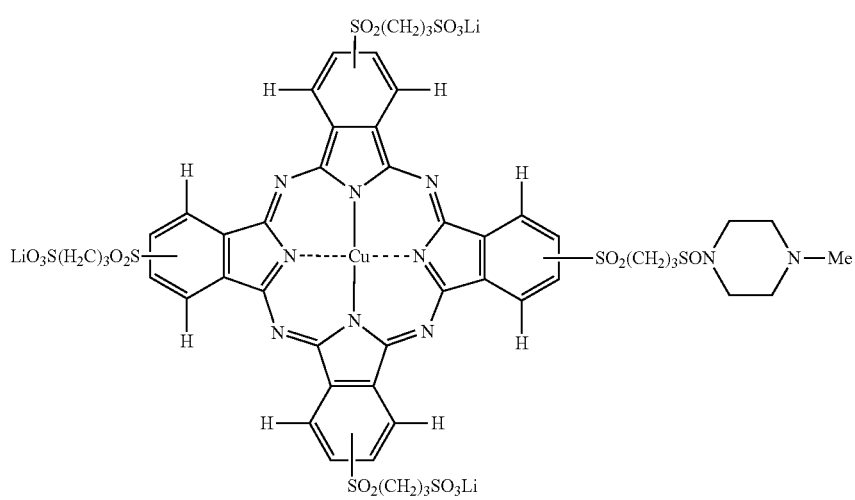

(2D)

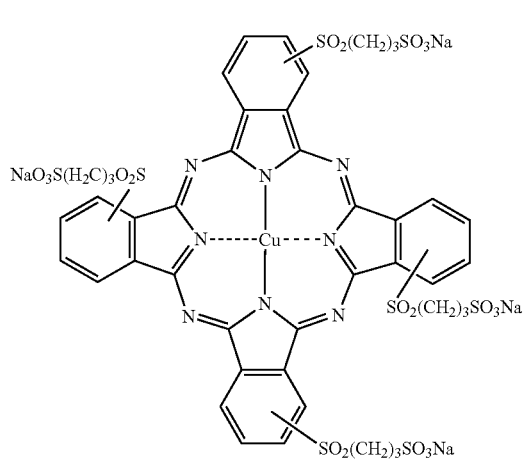

(Ratio of Substitution Position α/β = 50/50)

Comparative Compound 3

According to the present invention, there are provided a coloring composition in which color and ozone gas fastness are excellent, bronze gloss is suppressed, print quality such as print density is high, temporal stability and preserve performance are high at a high concentration, and particularly, discharge stability after long-term storage in an aqueous solution is excellent, an ink for inkjet recording using the coloring composition, a method for inkjet recording using the ink for inkjet recording, an ink cartridge, and an inkjet recording material.

The present invention has been described with reference to specific embodiments in detail, but it is obvious to one of ordinary skill in the art that various changes and modifications will be made without departing from the spirit and scope of the present invention.

What is claimed is:
1. A coloring composition comprising:
a phthalocyanine dye represented by Formula (1);
a phthalocyanine dye represented by Formula (2); and
at least one preservative:

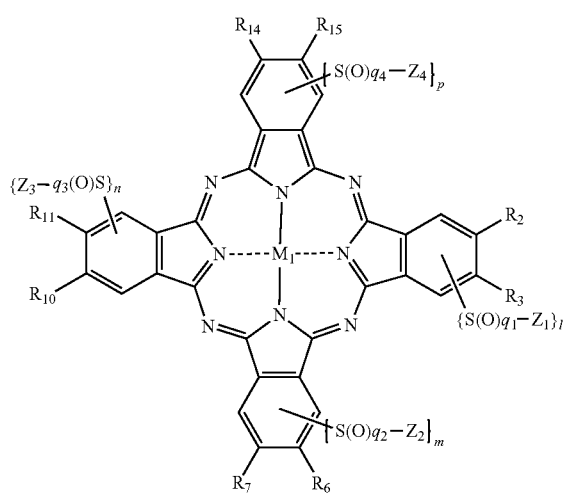

(1)

wherein in Formula (1), $R_2$, $R_3$, $R_6$, $R_7$, $R_{10}$, $R_{11}$, $R_{14}$ and $R_{15}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group, and these groups may further have a substituent, $Z_1$, $Z_2$, $Z_3$ and $Z_4$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that at least one of $Z_1$, $Z_2$, $Z_3$ and $Z_4$ has an ionic hydrophilic group as a substituent, l, m, n, p, $q_1$, $q_2$, $q_3$ and $q_4$ each independently represent 1 or 2, $M_1$ represents a hydrogen atom, a metal element, a metal oxide, a metal hydroxide or a metal halide:

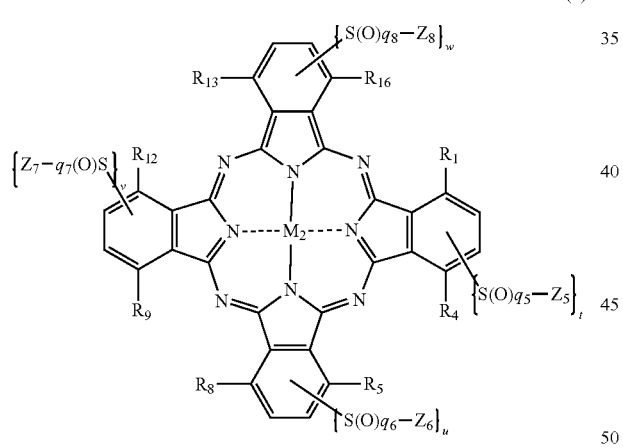

(2)

wherein in Formula (2), $R_1$, $R_4$, $R_5$, $R_8$, $R_9$, $R_{12}$, $R_{13}$ and $R_{16}$ each independently represent a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amide group, an arylamino group, a ureido group, a sulfamoylamino group, an alkylthio group, an arylthio group, an alkoxycarbonylamino group, a sulfonamide group, a carbamoyl group, a sulfamoyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imide group, a heterocyclic thio group, a phosphoryl group, an acyl group, or an ionic hydrophilic group, and these groups may further have a substituent, $Z_5$, $Z_6$, $Z_7$, and $Z_8$ each independently represent a substituted or unsubstituted alkyl group, a substituted or unsubstituted cycloalkyl group, a substituted or unsubstituted alkenyl group, a substituted or unsubstituted aralkyl group, a substituted or unsubstituted aryl group, or a substituted or unsubstituted heterocyclic group, provided that at least one of $Z_5$, $Z_6$, $Z_7$ and $Z_8$ has an ionic hydrophilic group as a substituent, t, u, v, w, $q_5$, $q_6$, $q_7$ and $q_8$ each independently represent 1 or 2, and $M_2$ represents a hydrogen atom, a metal element, a metal oxide, a metal hydroxide or a metal halide.

2. The coloring composition according to claim 1, wherein in the phthalocyanine dye represented by Formula (2), $R_1$, $R_4$, $R_5$, $R_8$, $R_9$, $R_{12}$, $R_{13}$ and $R_{16}$ are a hydrogen atom.

3. The coloring composition according to claim 1, wherein in the phthalocyanine dye represented by Formula (2), $Z_5$, $Z_6$, $Z_7$, and $Z_8$ each represent a substituted or unsubstituted alkyl group, a substituted or unsubstituted aryl group, or a substituted or unsubstituted heterocylic group.

4. The coloring composition according to claim 1, wherein in the phthalocyanine dye represented by Formula (2), $Z_5$, $Z_6$, $Z_7$, and $Z_8$ represent a substituted alkyl group, and at least one of substituent contained in the alkyl group is —$SO_2NHR$ group, provided that R represents a substituted or unsubstituted alkyl group or a substituted or unsubstituted phenyl group.

5. The coloring composition according to claim 1, wherein in the phthalocyanine dye represented by Formula (2), t, u, v and w are 1.

6. The coloring composition according to claim 1, wherein in the phthalocyanine dye represented by Formula (2), $q_5$, $q_6$, $q_7$ and $q_8$ are 2.

7. The coloring composition according to claim 1, wherein in the phthalocyanine dye represented by Formula (1), $R_2$, $R_3$, $R_6$, $R_7$, $R_{10}$, $R_{11}$, $R_{14}$ and $R_{15}$ are a hydrogen atom.

8. The coloring composition according to claim 1, wherein in the phthalocyanine dye represented the Formula (1), $Z_1$, $Z_2$, $Z_3$, and $Z_4$ each represent a substituted or unsubstituted alkyl group, a substituted or unsubstituted aryl group, or a substituted or unsubstituted heterocylic group.

9. The coloring composition according to claim 1, wherein in the phthalocyanine dye represented by Formula (1), l, m, n and p are 1.

10. The coloring composition according to claim 1, wherein in the phthalocyanine dye represented by Formula (1), $q_1$, $q_2$, $q_3$ and $q_4$ are 2.

11. The coloring composition according to claim 1, wherein a content of the phthalocyanine dye represented by Formula (1) is 0.1% by mass to 10% by mass.

12. The coloring composition according to claim 1, wherein a mass ratio of the phthalocyanine dye represented by Formula (1) and the phthalocyanine dye represented by Formula (2) is 50/50 to 10/90.

13. The coloring composition according to claim 1, wherein the at least one preservative includes at least one preservative selected from the group consisting of a heterocyclic compound, a phenol derivative, a phenoxy ether derivative, and alkanediols.

14. The coloring composition according to claim 13,
wherein the at least one preservative includes the heterocyclic compound, and
the heterocyclic compound is a thiazole-based compound or a benzotriazole-based compound.

15. The coloring composition according to claim 1, comprising two or more types of preservatives.

16. The coloring composition according to claim 15, wherein a content of each preservative is 20% by mass or more based on a total content of preservatives.

17. The coloring composition according to claim 1, wherein a total content of preservatives is 0.01% by mass to 0.5% by mass.

18. The coloring composition according to claim 1, wherein a mass ratio of a total amount of the phthalocyanine dye represented by Formula (1) and the phthalocyanine dye represented by Formula (2) to a total amount of preservatives, is 90/10 to 99/1.

19. An ink for inkjet recording comprising the coloring composition according to claim 1.

20. A method for inkjet recording comprising forming a color image on a material to be recorded using the ink for inkjet recording according to claim 19.

21. An ink cartridge for inkjet recording filled with the ink for inkjet recording according to claim 19.

22. An inkjet recording material which forms a color image on a material to be recorded using the ink for inkjet recording according to claim 19.

* * * * *